United States Patent
Chintala et al.

(10) Patent No.: US 11,675,784 B2
(45) Date of Patent: *Jun. 13, 2023

(54) CONFIGURING PARALLELISM PARAMETERS FOR INVOCATION OF EXTERNAL TABLE FUNCTIONS

(71) Applicant: Snowflake Inc., Bozeman, MT (US)

(72) Inventors: Srilakshmi Chintala, Seattle, WA (US); Istvan Cseri, Seattle, WA (US); Albert L. Hu, Seattle, WA (US); Isaac Kunen, Seattle, WA (US); Nitya Kumar Sharma, Bellevue, WA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,132

(22) Filed: Aug. 30, 2022

(65) Prior Publication Data
US 2022/0414094 A1    Dec. 29, 2022

Related U.S. Application Data

(63) Continuation of application No. 17/646,200, filed on Dec. 28, 2021, now Pat. No. 11,468,079, which is a
(Continued)

(51) Int. Cl.
*G06F 16/22*    (2019.01)
*G06F 16/2458*    (2019.01)
(Continued)

(52) U.S. Cl.
CPC ........ *G06F 16/245* (2019.01); *G06F 16/2282* (2019.01); *G06F 16/2471* (2019.01);
(Continued)

(58) Field of Classification Search
None
See application file for complete search history.

(56) References Cited

U.S. PATENT DOCUMENTS

| | | | |
|---|---|---|---|
| 7,769,825 | B2 | 8/2010 | Karakashian et al. |
| 8,176,283 | B1 | 5/2012 | Hanson et al. |
| (Continued) | | | |

FOREIGN PATENT DOCUMENTS

| | | |
|---|---|---|
| CN | 104754001 A | 7/2015 |
| CN | 110100228 A | 8/2019 |
| (Continued) | | |

OTHER PUBLICATIONS

"U.S. Appl. No. 17/302,388, 312 Amendment filed Aug. 24, 2021", 8 pgs.
(Continued)

*Primary Examiner* — Scott A. Waldron
(74) *Attorney, Agent, or Firm* — Schwegman Lundberg & Woessner, P.A.

(57) ABSTRACT

A query referencing an external table function provided by a remote software component is received. Requests to execute the external table function on input data are sent to a proxy service. A first request includes a batch of input rows from the input data. A first response to the first request received from the proxy service includes a first portion of result data and a pagination token. The pagination token indicates that at least a second portion of the result data corresponding to the first batch of input rows is to be obtained from the remote software component. Based on the pagination token, a second request is sent to obtain the second portion of the result data. One or more responses are received from the proxy service that comprise at least the second portion of the result data. The result data is processed according to the query.

30 Claims, 17 Drawing Sheets

Related U.S. Application Data continuation of application No. 17/388,142, filed on Jul. 29, 2021, now Pat. No. 11,243,947, which is a continuation of application No. 17/302,388, filed on Apr. 30, 2021, now Pat. No. 11,138,192.

(51) Int. Cl.
   *G06F 16/245* (2019.01)
   *G06F 16/958* (2019.01)
   *H04L 9/40* (2022.01)

(52) U.S. Cl.
   CPC ........ *G06F 16/986* (2019.01); *H04L 63/0281* (2013.01); *H04L 63/0846* (2013.01)

(56) References Cited

U.S. PATENT DOCUMENTS

| | | |
|---|---|---|
| 8,185,916 B2 | 5/2012 | Toussaint et al. |
| 8,234,372 B2 | 7/2012 | Knapp et al. |
| 8,656,454 B2 | 2/2014 | Gunawardena et al. |
| 8,713,038 B2 | 4/2014 | Cohen et al. |
| 8,713,633 B2 | 4/2014 | Thomas |
| 9,246,912 B2 | 1/2016 | Alexander et al. |
| 9,426,219 B1 | 8/2016 | Keyser |
| 9,483,627 B1 | 11/2016 | Ferg et al. |
| 9,503,452 B1 | 11/2016 | Kumar et al. |
| 9,588,977 B1 | 3/2017 | Wang et al. |
| 9,934,202 B1 | 4/2018 | Wang et al. |
| 10,180,973 B2 | 1/2019 | Shivarudraiah et al. |
| 10,628,244 B1 | 4/2020 | Cseri et al. |
| 10,715,524 B1 | 7/2020 | Paulus et al. |
| 10,810,067 B1 | 10/2020 | Cseri et al. |
| 10,846,157 B1 | 11/2020 | Cseri et al. |
| 10,867,063 B1 | 12/2020 | Avanes et al. |
| 10,963,459 B2 | 3/2021 | Schmidt et al. |
| 10,997,005 B1 | 5/2021 | Cseri et al. |
| 10,999,279 B1 | 5/2021 | Paulus et al. |
| 11,086,869 B1 | 8/2021 | Aleti et al. |
| 11,126,484 B2 | 9/2021 | Cseri et al. |
| 11,132,243 B2 | 9/2021 | Cseri et al. |
| 11,138,192 B1 | 10/2021 | Chintala et al. |
| 11,157,497 B1 | 10/2021 | Batsakis et al. |
| 11,157,498 B1 | 10/2021 | James et al. |
| 11,165,775 B2 | 11/2021 | Paulus et al. |
| 11,243,947 B1 | 2/2022 | Chintala et al. |
| 11,249,829 B2 | 2/2022 | Cseri et al. |
| 11,271,936 B2 | 3/2022 | Paulus et al. |
| 11,468,079 B1 | 10/2022 | Chintala et al. |
| 11,522,860 B2 | 12/2022 | Paulus et al. |
| 2003/0225765 A1 | 12/2003 | Frieden et al. |
| 2005/0108206 A1 | 5/2005 | Lam et al. |
| 2007/0174521 A1 | 7/2007 | Aritomi |
| 2010/0332479 A1 | 12/2010 | Prahlad et al. |
| 2010/0332818 A1 | 12/2010 | Prahlad et al. |
| 2010/0333116 A1 | 12/2010 | Prahlad et al. |
| 2011/0137973 A1 | 6/2011 | Wei et al. |
| 2011/0184813 A1 | 7/2011 | Barnes et al. |
| 2011/0276713 A1 | 11/2011 | Brand |
| 2011/0289314 A1 | 11/2011 | Whitcomb |
| 2012/0011578 A1 | 1/2012 | Hinton et al. |
| 2012/0110651 A1 | 5/2012 | Van Biljon et al. |
| 2012/0136960 A1 | 5/2012 | Liu |
| 2012/0191699 A1 | 7/2012 | Muthian et al. |
| 2013/0041872 A1 | 2/2013 | Aizman et al. |
| 2013/0138626 A1 | 5/2013 | Delafranier et al. |
| 2013/0205028 A1 | 8/2013 | Crockett et al. |
| 2013/0282798 A1 | 10/2013 | Mccarthy et al. |
| 2014/0013409 A1 | 1/2014 | Halageri |
| 2014/0020072 A1 | 1/2014 | Thomas |
| 2014/0115182 A1 | 4/2014 | Sabaa et al. |
| 2014/0122866 A1 | 5/2014 | Haeger et al. |
| 2014/0123265 A1 | 5/2014 | Borzycki et al. |
| 2014/0143543 A1 | 5/2014 | Aikas et al. |
| 2014/0149461 A1 | 5/2014 | Wijayaratne et al. |
| 2014/0215590 A1 | 7/2014 | Brand |
| 2014/0280032 A1 | 9/2014 | Kornacker et al. |
| 2015/0264111 A1 | 9/2015 | Aleksandrov |
| 2016/0219060 A1 | 7/2016 | Karunakaran et al. |
| 2016/0234209 A1 | 8/2016 | Kahol et al. |
| 2017/0046353 A1 | 2/2017 | Takata et al. |
| 2017/0208043 A1 | 7/2017 | Bohli et al. |
| 2017/0237729 A1 | 8/2017 | Uppalapati |
| 2017/0295059 A1 | 10/2017 | Necas et al. |
| 2017/0331829 A1 | 11/2017 | Lander et al. |
| 2017/0364694 A1 | 12/2017 | Jacob et al. |
| 2018/0338002 A1 | 11/2018 | Sherrill et al. |
| 2019/0163754 A1 | 5/2019 | Huang et al. |
| 2019/0347680 A1 | 11/2019 | Layman |
| 2020/0019546 A1 | 1/2020 | Luo et al. |
| 2020/0286011 A1 | 9/2020 | Meng et al. |
| 2021/0011627 A1 | 1/2021 | Sridharan |
| 2021/0124633 A1 | 4/2021 | Cseri et al. |
| 2021/0152553 A1 | 5/2021 | Paulus et al. |
| 2021/0211425 A1 | 7/2021 | Paulus et al. |
| 2021/0216385 A1 | 7/2021 | Cseri et al. |
| 2021/0240557 A1 | 8/2021 | Cseri et al. |
| 2021/0390007 A1 | 12/2021 | Cseri et al. |
| 2022/0021673 A1 | 1/2022 | Paulus et al. |
| 2022/0129335 A1 | 4/2022 | Cseri et al. |
| 2022/0150252 A1 | 5/2022 | Paulus et al. |
| 2022/0350794 A1 | 11/2022 | Chintala et al. |

FOREIGN PATENT DOCUMENTS

| | | |
|---|---|---|
| CN | 113228593 A | 8/2021 |
| CN | 113490918 A | 10/2021 |
| DE | 202020005693 U1 | 2/2022 |
| DE | 202020005700 U1 | 2/2022 |
| KR | 102444106 B1 | 9/2022 |
| WO | WO-2021/086465 A1 | 5/2021 |
| WO | WO-2021/096572 A1 | 5/2021 |
| WO | 2022232831 A1 | 11/2022 |

OTHER PUBLICATIONS

"U.S. Appl. No. 17/302,388, Notice of Allowance dated Jul. 20, 2021", 10 pgs.
"U.S. Appl. No. 17/302,388, Preliminary Amendment Filed May 6, 2021", 3 pgs.
"U.S. Appl. No. 17/302,388, PTO Response to Rule 312 Communication dated Sep. 7, 2021", 2 pgs.
"U.S. Appl. No. 17/388,142, Non Final Office Action dated Nov. 10, 2021", 10 pgs.
"U.S. Appl. No. 17/388,142, Notice of Allowance dated Dec. 8, 2021", 9 pgs.
"U.S. Appl. No. 17/388,142, Response filed Nov. 12, 2021 to Non Final Office Action dated Nov. 10, 2021", 9 pgs.
"U.S. Appl. No. 17/646,200, Examiner Interview Summary dated Jun. 2, 2022", 2 pgs.
"U.S. Appl. No. 17/646,200, Non Final Office Action dated Mar. 3, 2022", 20 pgs.
"U.S. Appl. No. 17/646,200, Notice of Allowance dated Jun. 23, 2022", 15 pgs.
"U.S. Appl. No. 17/646,200, Response filed Jun. 2, 2022 to Non Final Office Action dated Mar. 3, 2022", 14 pgs.
"International Application Serial No. PCT/US2022/072005, International Search Report dated Jun. 23, 2022", 2 pgs.
"International Application Serial No. PCT/US2022/072005, Written Opinion dated Jun. 23, 2022", 3 pgs.
Challa, Aditya, "Build and automate a modern serverless data lake on AWS", Amazon Web Services, reinvent, (2019), 45 pgs.
Cortesi, Damon, "Amazon Athena", (Apr. 30, 2019), 36 pgs.
Fuller, Matt, et al., "Presto: The Definitive Guide: SQL at Any Scale, on Any Storage, in Any Environment", O'Reilly Media, Inc., (Apr. 3, 2020), 311 pgs.
Rainey, Michael, "Continuous Data Replication Into Cloud Storage with Oracle Goldengate", Snowflake Computing, Inc., (Feb. 2019), 36 pgs.
Su, Xueyuan, et al., "Oracle in-database hadoop: when mapreduce meets RDBMS", In Proceedings of the 2012 ACM SIGMOD International Conference on Management of Data (SIGMOD '12), ACM, (2012), 779-789.

(56) References Cited

OTHER PUBLICATIONS

Vuppalapati, Midhul, et al., "Building an Elastic Query Engine on Disaggregated Storage", Proceedings of the 17th USENIX Symposium on Networked Systems Design and Implementation (NSDI '20), (Feb. 25-27, 2020), 15 pgs.
U.S. Appl. No. 17/302,388 U.S. Pat. No. 11,138,192, filed Apr. 30, 2021, Invoking External Table Functions From a Database System.
U.S. Appl. No. 17/388,142 U.S. Pat. No. 11,243,947, filed Jul. 29, 2021, Handshake Protocol to Facilitate Invocation of External Table Functions.
U.S. Appl. No. 17/646,200, filed Dec. 28, 2021, Partitioning to Support Invocation of External Table Functions on Multiple Batches of Input Rows.
"U.S. Appl. No. 16/666,911, Notice of Allowance dated Dec. 31, 2019", 9 pgs.
"U.S. Appl. No. 16/683,641, Examiner Interview Summary dated May 11, 2020", 3 pgs.
"U.S. Appl. No. 16/683,641, Non Final Office Action dated Feb. 20, 2020".
"U.S. Appl. No. 16/683,641, Notice of Allowance dated May 27, 2020", 14 pgs.
"U.S. Appl. No. 16/683,641, Response Filed May 15, 2020 to Non Final Office Action dated Feb. 20, 2020", 12 pgs.
"U.S. Appl. No. 16/821,430, Non Final Office Action dated May 21, 2020", 11 pgs.
"U.S. Appl. No. 16/821,430, Notice of Allowability dated Sep. 16, 2020", 2 pgs.
"U.S. Appl. No. 16/821,430, Notice of Allowance dated Sep. 4, 2020", 7 pgs.
"U.S. Appl. No. 16/821,430, Response Filed Aug. 17, 2020 to Non Final Office Action dated May 21, 2020", 11 pgs.
"U.S. Appl. No. 16/911,850, Non Final Office Action dated Sep. 29, 2020", 15 pgs.
"U.S. Appl. No. 16/911,850, Notice of Allowance dated Jan. 19, 2021", 15 pgs.
"U.S. Appl. No. 16/911,850, Response filed Dec. 16, 2020 to Non Final Office Action dated Sep. 29, 2020", 11 pgs.
"U.S. Appl. No. 16/942,646, Notice of Allowance dated Aug. 19, 2020", 9 pgs.
"U.S. Appl. No. 16/942,646, Supplemental Notice of Allowability dated Oct. 23, 2020", 2 pgs.
"U.S. Appl. No. 17/028,466, Non Final Office Action dated Dec. 3, 2020", 11 pgs.
"U.S. Appl. No. 17/028,466, Notice of Allowance dated Mar. 26, 2021", 7 pgs.
"U.S. Appl. No. 17/028,466, Response filed Mar. 2, 2021 to Non Final Office Action dated Dec. 3, 2020", 11 pgs.
"U.S. Appl. No. 17/219,858, Notice of Allowance dated Jun. 24, 2021", 9 pgs.
"U.S. Appl. No. 17/219,858, Supplemental Notice of Allowability received dated Jul. 8, 2021", 2 pg.
"U.S. Appl. No. 17/238,558, Notice of Allowance dated Jul. 8, 2021", 11 pgs.
"U.S. Appl. No. 17/238,558, Supplemental Notice of Allowability received dated Jul. 26, 2021", 2 pgs.
"U.S. Appl. No. 17/249,971, Examiner Interview Summary dated Aug. 30, 2021", 2 pgs.
"U.S. Appl. No. 17/249,971, Non Final Office Action dated May 25, 2021", 42 pgs.
"U.S. Appl. No. 17/249,971, Notice of Allowance dated Sep. 10, 2021", 16 pgs.
"U.S. Appl. No. 17/249,971, Response Filed Aug. 25, 2021 to Non Final Office Action dated May 25, 2021", 11 pgs.
"U.S. Appl. No. 17/461,576, Notice of Allowance dated Nov. 24, 2021", 11 pgs.
"U.S. Appl. No. 17/461,576, Supplemental Notice of Allowability dated Jan. 20, 2022", 2 pgs.
"U.S. Appl. No. 17/491,373, Non Final Office Action dated Nov. 23, 2021", 10 pgs.
"U.S. Appl. No. 17/491,373, Notice of Allowance dated Dec. 22, 2021", 15 pgs.
"U.S. Appl. No. 17/491,373, Response filed Nov. 29, 2021 to Non Final Office Action dated Nov. 23, 2021", 10 pgs.
"U.S. Appl. No. 17/587,829, Corrected Notice of Allowability dated Nov. 8, 2022", 2 pgs.
"U.S. Appl. No. 17/587,829, Non Final Office Action dated Apr. 25, 2022", 41 pgs.
"U.S. Appl. No. 17/587,829, Notice of Allowance dated Aug. 15, 2022", 15 pgs.
"U.S. Appl. No. 17/587,829, Response filed Jul. 25, 2022 to Non Final Office Action dated Apr. 25, 2022", 10 pgs.
"Chinese Application Serial No. 202080007495.4, Voluntary Amendment filed Jan. 13, 2022", w/ English Claims, 60 pgs.
"Chinese Application Serial No. 202080007511.X, Office Action dated Jan. 11, 2022", (w/ English Translation), 9 pgs.
"Chinese Application Serial No. 202080007511.X, Office Action dated Jun. 23, 2022", (w/ English Translation), 7 pgs.
"Chinese Application Serial No. 202080007511.X, Office Action dated Oct. 10, 2022", (w/ English Translation), 3 pgs.
"Chinese Application Serial No. 202080007511.X, Response filed May 11, 2022 to Office Action dated Jan. 11, 2022", (w/ Translation of English Claims), 24 pgs.
"Chinese Application Serial No. 202080007511.X, Response filed Aug. 23, 2022 to Office Action dated Jun. 23, 2022", (w/ English Translation of Claims), 24 pgs.
"Chinese Application Serial No. 202080007511.X, Response filed Dec. 8, 2022 to Office Action dated Oct. 10, 2022", w/ English Claims, 45 pgs.
"European Application Serial No. 20714015.3, Response filed May 6, 2022 to Communication pursuant to Rules 161 and 162 dated Oct. 27, 2021", 18 pgs.
"European Application Serial No. 20881985.4, Extended European Search Report dated Oct. 26, 2022", 7 pgs.
"European Application Serial No. 20881985.4, Response to Communication persuant to Rules 161 and 162 filed May 4, 2022", 19 pgs.
"European Application Serial No. 20887419.8, Extended European Search Report dated Nov. 29, 2022", 8 pgs.
"Indian Application Serial No. 202147043981, First Examination Report dated Jun. 15, 2022", 7 pgs.
"Indian Application Serial No. 202147046151, First Examination Report dated Jun. 16, 2022", 6 pgs.
"Indian Application Serial No. 202147046151, Response filed Dec. 16, 2022 to First Examination Report dated Jun. 16, 2022", 35 pgs.
"International Application Serial No. PCT/US2020/044195, International Preliminary Report on Patentability dated May 27, 2022", 9 pgs.
"International Application Serial No. PCT/US2020/044195, International Search Report dated Sep. 8, 2020", 2 pgs.
"International Application Serial No. PCT/US2020/044195, Written Opinion dated Sep. 8, 2020", 7 pgs.
"International Application Serial No. PCT/US2020/044447, International Preliminary Report on Patentability dated May 12, 2022", 5 pgs.
"International Application Serial No. PCT/US2020/044447, International Search Report dated Aug. 26, 2020", 2 pgs.
"International Application Serial No. PCT/US2020/044447, Written Opinion dated Aug. 26, 2020", 3 pgs.
"Korean Application Serial No. 10-2021-7030727, Notice of Preliminary Rejection dated Mar. 3, 2022", (w/ English Translation), 6 pgs.
"Korean Application Serial No. 10-2021-7030727, Response filed May 2, 2022 to Notice of Preliminary Rejection dated Mar. 3, 2022", (w/ English Translation), 24 pgs.
"Korean Application Serial No. 10-2021-7031176, Notice of Preliminary Rejection dated Jul. 15, 2022", (w/ English Translation), 13 pgs.
"Korean Application Serial No. 10-2021-7031176, Response filed Nov. 9, 2022 to Notice of Preliminary Rejection dated Jul. 15, 2022", (w/ English Translations of Claims), 21 pgs.

(56) References Cited

OTHER PUBLICATIONS

Anjanadevi, et al., "An Efficient Dynamic Indexing and Metadata Based Storage in Cloud Environment", International Conference on Recent Trends in Information Technology, (Apr. 2014), 1-6.

Eissa, et al., "A Fine Grained Access Control and Flexible Revocation Scheme for Data Security on Public Cloud Storage Services", International Conference on Cloud Computing Technologies, Applications and Management, (Dec. 2012), 27-33.

Pereira, et al., "Storekeeper: A Security-Enhanced Cloud Storage Aggregation Service", IEEE 35th Symposium on Reliable Distributed Systems, (Sep. 2016), 111-120.

Yao, et al., "Anonymous Credential-Based Access Control Scheme for Clouds", IEEE Cloud Computing, vol. 2, No. 4, (Jul. 2015), 34-43.

Ye, Xinfeng, "Access Control for Cloud Applications", IEEE 12th International Conference on Ubiquitous Intelligence and Computing and IEEE 12th Inti Conference on Autonomic and Trusted Computing, (Aug. 2015), 970-977.

U.S. Appl. No. 16/666,911 U.S. Pat. No. 10,628,244, filed Oct. 29, 2019, Calling External Functions From a Data Warehouse.

U.S. Appl. No. 16/821,430 U.S. Pat. No. 10,810,067, filed Mar. 17, 2020, Calling External Functions From a Data Warehouse.

U.S. Appl. No. 19/942,646 U.S. Pat. No. 10,846,157, filed Jul. 29, 2020, Establishing Data Platform Integrations to Call External Functions.

U.S. Appl. No. 17/028,466 U.S. Pat. No. 10,997,005, filed Sep. 22, 2020, Establishing Data Objects to Facilitate Calls to External Functions.

U.S. Appl. No. 17/219,858 U.S. Pat. No. 11,132,243, filed Mar. 31, 2021, Invoking External Functions From a Data System.

U.S. Appl. No. 17/461,576 U.S. Pat. No. 11,249,829, filed Aug. 20, 2021, Refreshing Security Credentials Used to Invoke an External Function.

U.S. Appl. No. 17/238,558 U.S. Pat. No. 11,126,484, filed Apr. 23, 2021, Invoking External Table Functions From a Data System.

U.S. Appl. No. 17/572,205, filed Jan. 10, 2022, External Function Invocation by a Data System.

CONFIGURING PARALLELISM PARAMETERS FOR INVOCATION OF EXTERNAL TABLE FUNCTIONS

CROSS-REFERENCE TO RELATED APPLICATIONS

This application is a Continuation of U.S. patent application Ser. No. 17/646,200, filed Dec. 28, 2021, which is a Continuation of U.S. patent application Ser. No. 17/388,142, filed Jul. 29, 2021 and now issued as U.S. Pat. No. 11,243,947, which is a Continuation of U.S. patent application Ser. No. 17/302,388, filed Apr. 30, 2021 and now issued as U.S. Pat. No. 11,138,192, the contents of which are hereby incorporated by reference in their entireties.

TECHNICAL FIELD

Embodiments of the disclosure relate generally to a cloud database system and, more specifically, to calling external table functions from a cloud database system.

BACKGROUND

Cloud database systems such as cloud data warehouses are network-based systems used for data analysis and reporting that often include a central repository of integrated data from one or more disparate sources. A cloud database system can store current and historical data that can be used for creating analytical reports for an enterprise.

Often, cloud database system users wish to make use of external functionality to analyze or otherwise process data stored internally by the database system or stored by an external system. However, conventional cloud database systems do not provide users an ability to call out to a remote software component (e.g., code) that can provide such functionality.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
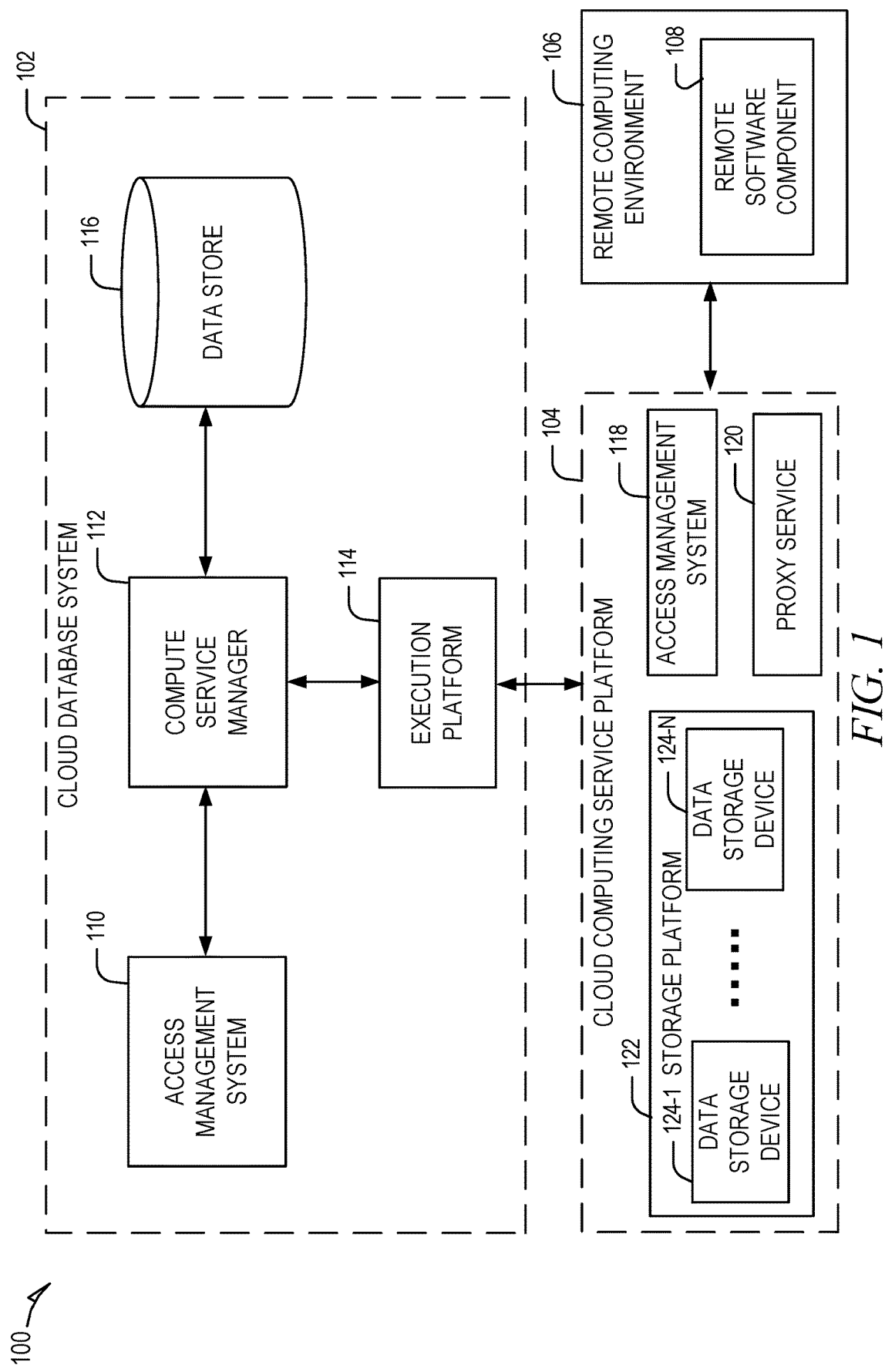
FIG. 1 illustrates an example computing environment in which a cloud database system invokes external functionality provided by a remote software component, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform are referred to as partitions. Groups of rows in tables may be mapped into individual partitions organized in a columnar fashion. In different implementations, a data platform may store metadata in partitions as well.

As noted above, conventional cloud database systems do not provide users an ability to call out to a remote software component (e.g., code) that can provide such functionality. As an example, a user may wish to utilize functionality provided by a third party (e.g., a third-party geocoder) within the context of the database system. As another example, a user may wish to encode or reuse existing business logic (e.g., a complex loss calculation or a machine learning algorithm) within the context of the database system. As yet another example, a user may wish to notify or otherwise trigger external functionality such as a notification system within the context of the database system. As still another example, a user may wish to export data from the database system in a way that is driven from within the context of the database system.

Additional problems are often encountered by database system users when trying to exchange data between two data sources due to a mismatch in format of the data as well as an absence of connectivity between the two sources. In view of this, conventional approaches for exchanging data are handled through offline export and import mechanisms that rely on static files. However, the conventional approach does not adequately address situations where the source data is transient or changes very frequently (e.g., stock price lookup or weather data). The process of exporting and then transferring files adds significant latency, and frequently this latency makes the data unusable.

Aspects of the present disclosure address the above and other deficiencies of conventional database systems by providing a cloud database system that provides users an ability to define and invoke external functionality such as a table function provided by a remote software component. The cloud database system described herein provides an ability to bind a function (e.g., a Structured Query Language (SQL) function), table function, or procedure to remote software code that is external to the database system and exposed as a web application programming interface (API). The cloud database system further provides users an ability to run queries against external data sources using a table-like abstraction over an external system.

The cloud database system provides users a mechanism to author functions and stored procedures that are backed by externally implemented web endpoints (e.g., HyperText Transfer Protocol (HTTP) Representational State Transfer (REST) endpoints) in an externally managed proxy service (also referred to as a "web application programming interface (API) management system") provided a cloud computing service platform (e.g., Amazon Web Services® (AWS), Microsoft Azure®, or Google Cloud Services®). Users are responsible for provisioning web endpoints and configuring the endpoints based on business logic within the storage platform. In some instances, the proxy service transforms proxy requests to Lambda functions, and in other instances, the proxy service transforms and forwards the requests to third-party software components that are external to the cloud database system. The cloud database system enables external functions provided by these external software components to be used in queries like user-defined functions, user-defined table functions and stored procedures.

The cloud database system stores various data objects to enable the invocation of external functionality provided by remote software components. The data objects store information that is used by the cloud database system to obtain temporary security credentials to be used in invoking the external functionality via a proxy service provided by a cloud computing platform. During execution of a query, the cloud database system authenticates with a target endpoint, via an authentication system of the cloud computing service platform, using the temporary security credentials, and invokes functionality at the endpoint with batches of target data as defined in the query. Target data may, for example, comprise binary data, JavaScript Object Notation (JSON) encoded data or other textual formats such as eXtensible Markup Language (XML). Target data may be passed inline with HTTP requests/responses or written to a commonly accessed storage provided by the cloud computing service platform (e.g., Amazon® Simple Storage Service (S3®)). User data stored by the cloud database system is encoded in a format suitable to be passed through HTTP requests and responses.

From the perspective of a user, external code can be made a seamless part of the database system functionality similar to any internally-defined function or procedure. That is, the database system can access systems that are, by their nature, external to the database system (e.g., geocoding systems). Further, users are enabled to use any arbitrary external code regardless of the language used to author the code or the system on which the code executes. Moreover, the cloud database system described herein allows users to invoke external functionality while avoiding security concerns that can arise from executing the code within the database system and do so in a manner that is orthogonal to the functionality of the database system (e.g., an external function can be used in any query). In addition, the technique for invoking external functionality from the database externalizes security-sensitive authentication information since this information is handled by the cloud computing service platform rather than the cloud database system itself.

With specific reference to invocation of external table functions, zero or more rows can be returned for each invocation (e.g., each input row). The data format used for invoking scalar functions can be extended to support table functions. Data can be converted to the data format by the remote software component or custom serializers/deserializers can be utilized by the cloud database system to convert response data to tabular format. In this manner, users will be able to return any number of rows and columns, (effectively a table) for a single input row in a batch. A query engine within the cloud database system understands the contract and processes responses from the remote software component as a set of rows, thereby allowing other parts of the query processing engine to operate on the response data as a table and apply other operators such as join or partition, for example.

With external table functions, users are enabled to run queries against external data sources using a table-like abstraction over the external system. Users can query, join, partition the external data using an SQL interface without having to ingest the data into the database system separately first. This is especially useful when the user does not want to copy the data from the external system and only wants to run analysis and store the result of the analysis. This reduces the overall storage costs, especially for temporary and intermediate data. The table abstraction also makes it a lot easier to query and join across multiple live data sources. For example, for an organization, the most common databases for storing employee data are in external systems. With table functions it will be possible to write a query to join and analyze the data from these external systems without having to first bulk ingest the raw data into the database system. Even for ingestion, the ability to invoke external table functions eliminates the need to export and import the data, making the process faster and seamless, which is especially useful when working with live data (e.g., weather or stock data) and for database migrations.

In addition, because external table functions can eliminate a need for using static files for data transfer, the external table functions allow seamless and continuous data exchange between the database system and external systems, using a programmatic interface. This presents integration points to enable data governance scenarios, such as access policies, tokenization, auditing, quota management, etc.

External table functions also enable working with subgroups of rows, which can be useful in the scenario where a user wants the database system to do the heavy lifting to figure out all the subgroups and then let the external table function process the subgroups. In an example, an analyst wants to run a query in the database system to find the total money spent per office location on employee salaries but the human relations (HR) department does not want the analyst to see the individual employees' salaries. This can be achieved using an external table function with partitioning. The analyst can partition the data and send the subgroups (e.g., one for each office location) containing employee identifiers for each office location. The external table function retrieves individual employee salaries and then returns the total compensation for each subgroup.

FIG. 1 illustrates an example computing environment 100 in which a cloud database system 102 invokes an external function provided by a remote software component, in accordance with some embodiments of the present disclosure. To avoid obscuring the inventive subject matter with unnecessary detail, various functional components that are not germane to conveying an understanding of the inventive subject matter have been omitted from FIG. 1 and subsequent FIGS. 2-4. However, a skilled artisan will readily recognize that various additional functional components may be included as part of the computing environment 100 to facilitate additional functionality that is not specifically described herein.

As shown, the computing environment 100 comprises the cloud database system 102, a cloud computing service platform 104 (e.g., AWS®, Microsoft Azure®, or Google Cloud Services®), and a remote computing environment 106. The cloud database system 102 is a network-based system used for reporting and analysis of integrated data from one or more disparate sources (e.g., the cloud computing service platform 104). The cloud computing service platform 104 comprises a plurality of computing machines and provides on-demand computer system resources such as data storage and computing power to the cloud database system 102.

The remote computing environment 106 comprises one or more computing machines that execute a remote software component 108 to provide additional functionality to users of the cloud database system 102. In some embodiments, the remote computing environment 106 may be included in or provided by the cloud computing service platform 104.

The remote software component 108 comprises a set of machine-readable instructions (e.g., code) that, when executed by the remote computing environment 106, cause the remote computing environment 106 to provide certain functionality. The remote software component 108 may operate on input data and generates result data based on processing, analyzing, or otherwise transforming the input data. As an example, the remote software component 108 may comprise a scalar function, a table function, or a stored procedure. External scalar functions can, for example, be used as a mechanism to trigger actions in external systems, which can enhance existing extract, transform, load (ETL) pipelines or enable entirely new data processing scenarios. For example, an external scalar function can be used to send an email or notification or to start a machine learning training job in a component of the cloud computing service platform 104. External stored procedures can, for example, run nested SQL queries in the context of the same session that called the stored procedure.

The cloud database system 102 comprises an access management system 110, a compute service manager 112, an execution platform 114, and a data store 116. The access management system 110 is the internal access control system for the cloud database system 102 and enables administrative users to manage access to resources and services provided by the cloud database system 102. Administrative users can create and manage users, roles, and groups, and use permissions to allow or deny access to resources and services.

The compute service manager 112 coordinates and manages operations of the cloud database system 102. The compute service manager 112 also performs query optimization and compilation as well as managing clusters of computing services that provide compute resources (also referred to as "virtual warehouses"). The compute service manager 112 can support any number of client accounts such as end users providing data storage and retrieval requests, system administrators managing the systems and methods described herein, and other components/devices that interact with compute service manager 112.

The compute service manager 112 is also coupled to data store 116, which is associated with the entirety of data stored the computing environment 100. The data store 116 stores data pertaining to various functions and aspects associated with the cloud database system 102 and its users. For example, the data store 116 stores various data objects that enable the cloud database system 102 to invoke external functionality provided by the remote software component 108. Further details regarding creation and use of these data objects are discussed below in reference to FIGS. 2-14.

In some embodiments, data store 116 includes a summary of data stored in remote data storage systems as well as data available from a local cache. Additionally, data store 116 may include information regarding how data is organized in the remote data storage systems and the local caches. Data store 116 allows systems and services to determine whether a piece of data needs to be accessed without loading or accessing the actual data from a storage device.

The compute service manager 112 is further coupled to the execution platform 114, which provides multiple computing resources that execute various data storage and data retrieval tasks. Execution platform 114 is coupled to storage platform 122 provided by the cloud computing service platform 104. The storage platform 122 comprises multiple data storage devices 124-1 to 124-N. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3™ storage systems or any other data storage technology. Additionally, cloud computing service platform 104 may include distributed file systems (such as Hadoop Distributed File Systems (HDFS)), object storage systems, and the like.

The execution platform 114 comprises a plurality of compute nodes. A set of processes on a compute node executes a query plan compiled by the compute service manager 112. The set of processes can include: a first process to execute the query plan; a second process to monitor and delete partition files using a least recently used (LRU) policy, and implement an out-of-memory (OOM) error mitigation process; a third process that extracts health information from process logs and status to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing service platform 104 also comprises an access management system 118 and a proxy service 120. The access management system 118 is an access control system provided by the cloud computing service platform 104 that allows users to create and manage users, roles, and groups, and use permissions to allow or deny access to cloud services and resources within the context of the cloud computing service platform 104. A user can, for example, create a role within the context of the cloud computing service platform 104 that has permissions to make web calls to the remote software component 108 via the proxy service 120. The access management system 110 of the cloud database system 102 and the access management system 118 of the cloud computing service platform 104 can communicate and share information so as to enable access and management of resources and services shared by users of both the cloud database system 102 and the cloud computing service platform 104.

The proxy service 120 handles tasks involved in accepting and processing concurrent API calls, including traffic management, authorization and access control, monitoring, and API version management. The proxy service 120 provides HTTP proxy service for creating, publishing, maintaining, securing, and monitoring APIs (e.g., REST APIs).

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. This architecture supports dynamic changes to the cloud database system 102 based on the changing data storage/retrieval needs as well as the changing needs of the users and systems accessing the cloud database system 102. The support of dynamic changes allows cloud database system 102 to scale quickly in response to changing demands on the systems and components within cloud database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Compute service manager 112, data store 116, execution platform 114, cloud computing service platform 104, and remote computing environment 106 are shown in FIG. 1 as individual components. However, each of compute service manager 112, data store 116, execution platform 114, cloud computing service platform 104, and remote computing environment 106 may be implemented as a distributed system (e.g., distributed across multiple systems/platforms at multiple geographic locations). Additionally, each of compute service manager 112, data store 116, execution platform 114, and cloud computing service platform 104 can be scaled up or down (independently of one another) depending on changes to the requests received and the changing needs of the cloud database system 102. Thus, in the described embodiments, the cloud database system 102 is dynamic and supports regular changes to meet the current data processing needs.

During typical operation, the cloud database system 102 processes multiple jobs determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task and, therefore, be a good candidate for processing the task. Metadata stored in the data store 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing service platform 104. It is desirable to retrieve as much data as possible from caches within the execution platform 114 because the retrieval speed is typically much faster than retrieving data from the cloud computing service platform 104.

As shown in FIG. 1, the computing environment 100 separates the execution platform 114 from the cloud computing service platform 104. In this arrangement, the processing resources and cache resources in the execution platform 114 operate independently of the data storage devices 124-1 to 124-N in the cloud computing service platform 104. Thus, the computing resources and cache resources are not restricted to specific data storage devices 124-1 to 124-N. Instead, all computing resources and all cache resources may retrieve data from, and store data to, any of the data storage resources in the cloud computing service platform 104.

Figure 2:
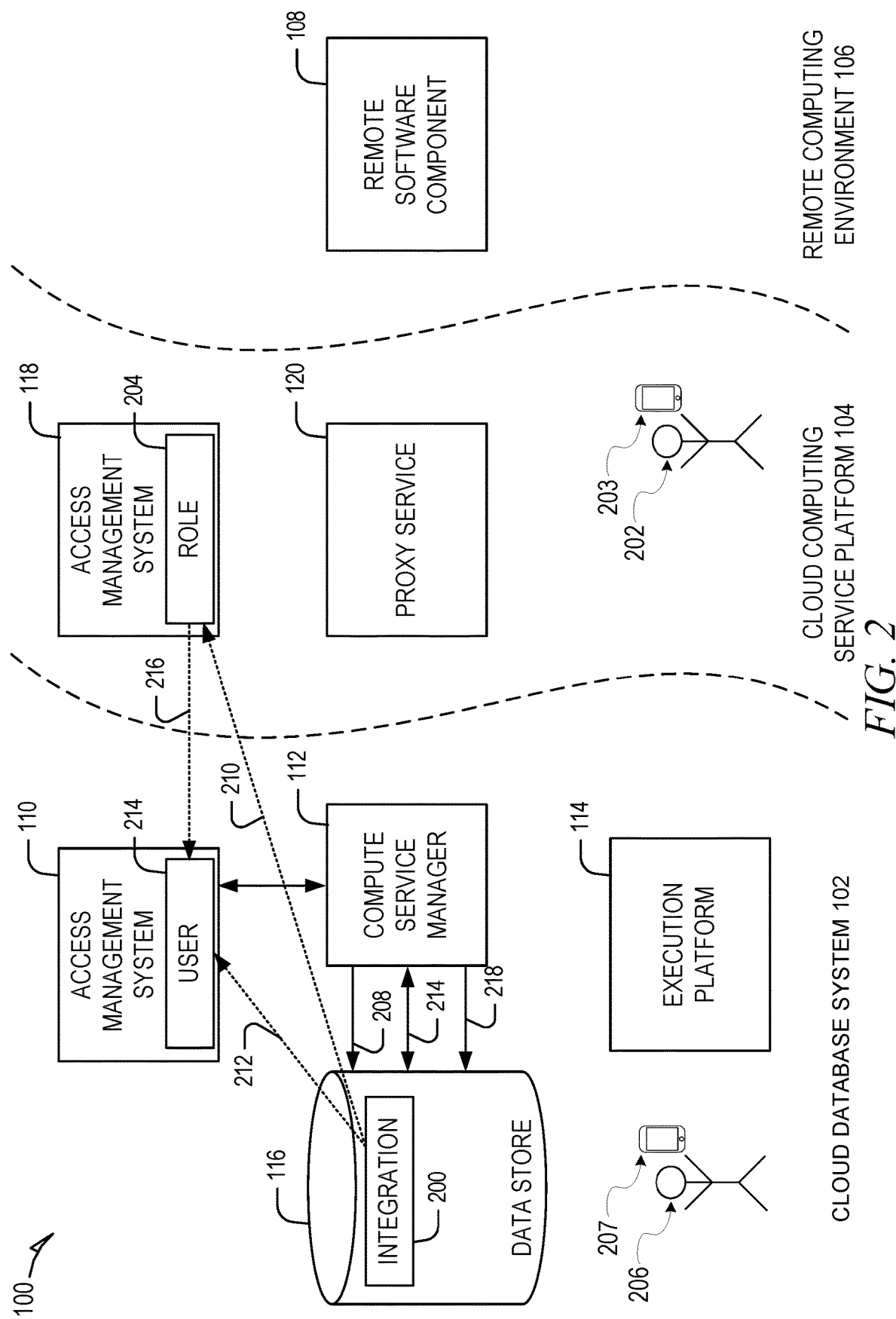
FIG. 2 is a data flow diagram illustrating creation of an integration object within the computing environment, in accordance with some embodiments of the present disclosure.

FIG. 2 is a data flow diagram illustrating creation of an integration object 200 within the computing environment 100, in accordance with some embodiments of the present disclosure. As shown, an administrative user 202 of the cloud computing service platform 104 uses the access management system 118 of the cloud computing service platform 104 to create a role 204. A role 204 in the context of the cloud computing service platform 104 is an identity with a set of permissions for making services requests within the cloud computing service platform 104. A role 204 is similar to a user in that it is an identity with permission policies that determine what the identity can do within the cloud computing service platform 104, but rather than being uniquely associated with a single person like a user, a role 204 is an identity that can be assumed by multiple users. A role 204 also does not have long-term security credentials; instead, a user that is assuming a role 204 is provided temporary security credentials that expire after an expiration time.

The administrative user 202 of the cloud computing service platform 104 creates the role 204 with permission to call web endpoints corresponding to the remote software component 108. For example, the administrative user 202 can utilize a user interface provided to computing device 203 by the cloud computing service platform 104 to provide appropriate input to cause the access management system 118 to create the role 204.

The cloud computing service platform 104 assigns a resource identifier to the role 204. The administrative user 202 interacts further with the access management system 118 using the UI provided to computing device 203 to obtain the resource identifier associated with the role 204 and communicates this resource identifier to an administrative user 206 of the cloud database system 102.

At operation 208, the compute service manager 112 creates the integration object 200 in the data store 116 based on input provided by the administrative user 206 including the resource identifier associated with the role 204 and a scheme for allowing/denying web calls based on target uniform resource locators (URLs). As an example, the administrative user 206 can utilize a UI provided to computing device 207 by the cloud database system 102 to provide the input and cause the compute service manager 112 to create the integration object 200.

The scheme for allowing/denying web calls can comprise a whitelist of permissible URLs to which web calls may be made, a blacklist of impermissible URLs to which web calls are not permitted, or both. In general, the scheme is used by the compute service manager 112 to restrict which endpoints can be used with the integration. The integration object 200 generated by the compute service manager 112 includes: a reference 210 to the resource identifier associated with the role 204, a reference 212 to a resource identifier associated with a user record 214, and the scheme defining allowed/restricted URLs. In some embodiments, the integration object 200 may further comprise a reference to an external identification (ID) string generated by the compute service manager 112. The external ID string generated by the compute service manager 112 can be used to establish a trust relationship between the role 204 and the user record 214.

The access management system 110 can maintain a pool of user records and can select the user record 214 to assign to and include in the integration object 200. At operation 216, the administrative user 206 interacts with the compute service manager 112 to extract the resource identifier of the user record 214 and the external ID string included in the integration object 200 and communicates the resource identifier of the user record 214 and the external ID string to the administrative user 202 in an out-of-band communication.

The administrative user 202 interacts with the access management system 118 to establish a trust relationship between the role 204 and the user record 214 to enable a user corresponding to the user record 214 to assume the role 204 and send web calls to the remote software component 108 via the proxy service 120. As a result, the role 204 is updated to include a reference 216 to the user record 214.

At operation 218, the compute service manager 112 grants usage rights to the integration object 200 to one or more users associated with the administrative user 206 based on input provided by the administrative user 206 via the UI provided to computing device 207.

Figure 3:
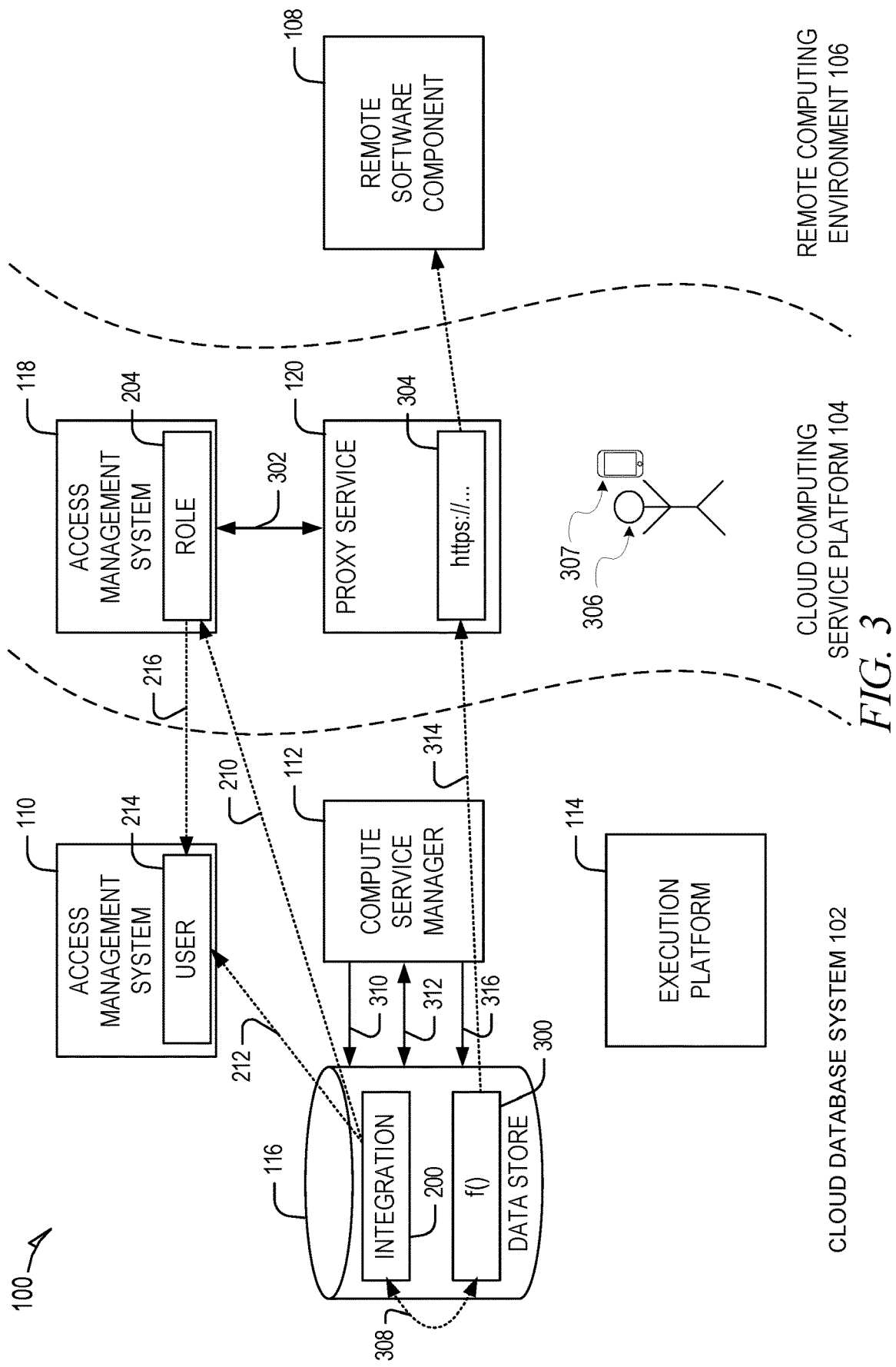
FIG. 3 is a data flow diagram illustrating creation of a function object within the computing environment, in accordance with some embodiments of the present disclosure.

FIG. 3 is a data flow diagram illustrating creation of a function object 300 within the computing environment 100, in accordance with some embodiments of the present disclosure. As shown, at operation 302, the proxy service 120 is configured to include a target web endpoint 304 (also referred to herein simply as "target endpoint 304") corresponding to the remote software component 108. The target endpoint 304 can comprise a uniform resource locator (URL) corresponding to the remote software component 108. The proxy service 120 is configured by a function author 306 using a UI provided to computing device 307 by the cloud computing service platform 104. The function author 306 is a user with access to an account with the cloud computing service platform 104 and an account with the cloud database system 102. The target endpoint 304 is configured to be authenticated by the access management system 118 of the cloud computing service platform 104 using a resource policy that allows permissions granted to the role 204 to be invoked.

The compute service manager 112 receives a function definition from the computing device 307. The function definition can be specified by the function author 306 using a UI provided to the computing device 307 by the cloud database system 102. The function definition identifies the integration object 200 and the target endpoint 304. In some embodiments, the function definition can comprise a maximum batch size for batching rows into requests sent to the proxy service 120.

The compute service manager 112 (at operation 310) checks whether the URL for the target endpoint 304 is allowed by the scheme that defines allowed/restricted URLs. If not, the compute service manager 112 rejects the function definition. Otherwise, the compute service manager 112 creates the function object 300 in the data store 116 (at operation 312). The function object 300 specifies a function that can be used in a query (e.g., SQL query) by invoking the external functionality provided by the remote software component 108. As an example, the function can be a scalar function that takes one or more input parameters and returns a single value. As another example, the function can be a table function that returns zero or more rows for each invocation.

The function object 300 comprises a reference 308 (e.g., a pointer) to the integration object 200 and a reference 314 to the target endpoint 304 (e.g., a URL corresponding to the target endpoint 304). At operation 316, the compute service manager 112 grants usage rights to the function object 300 to one or more users of the cloud database system 102 based on input provided by the function author 306 via the UI provided to computing device 307.

Figure 4:
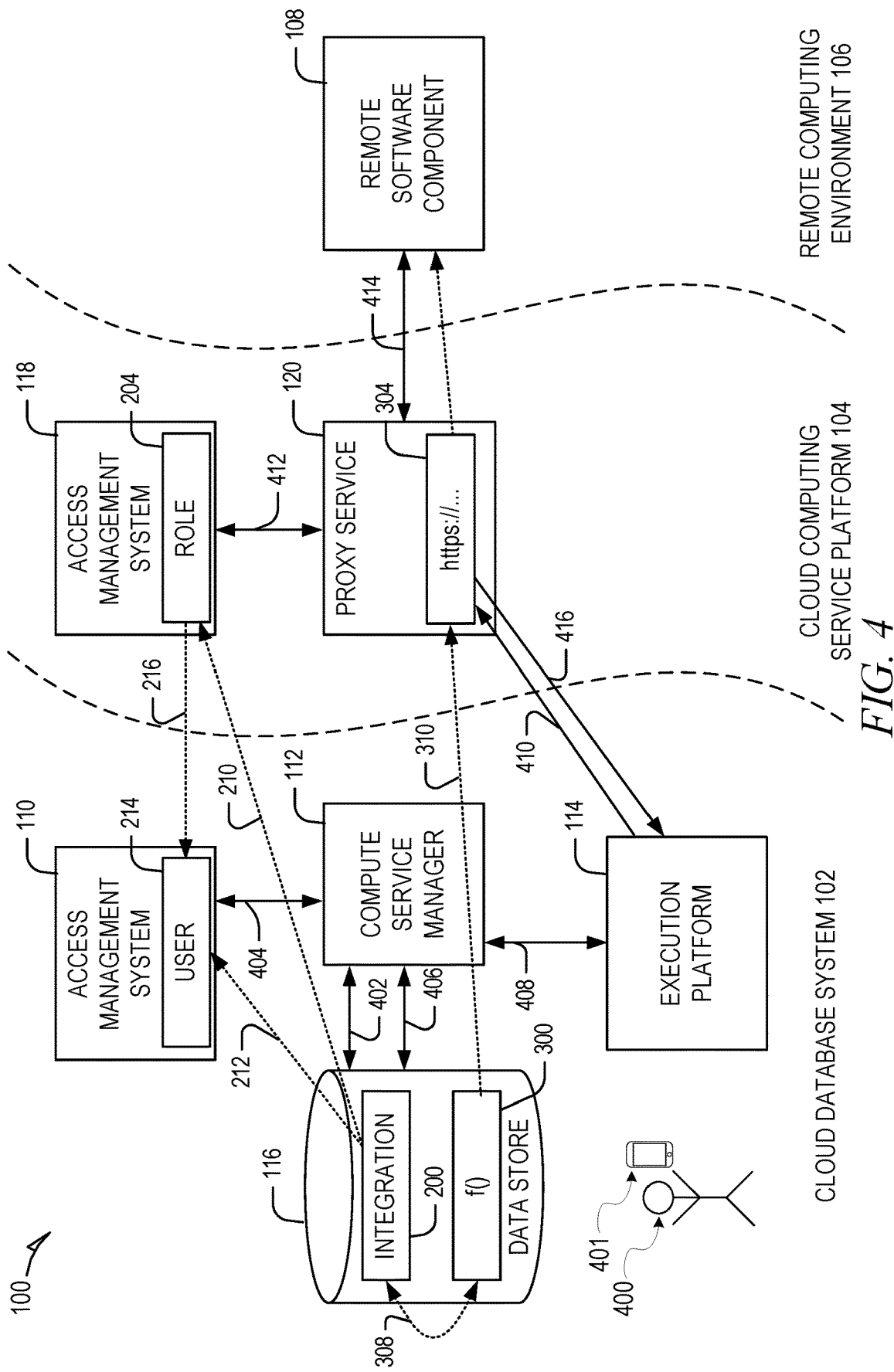
FIG. 4 is a data flow diagram illustrating invocation of external functionality provided by the remote software component by a cloud database system within the computing environment, in accordance with some embodiments of the present disclosure.

FIG. 4 is a data flow diagram illustrating invocation of an external function provided by remote software component 108 by the cloud database system 102 within the computing environment 100, in accordance with some embodiments of the present disclosure. The invocation of the external function is initiated by a function caller 400 issuing a query to the compute service manager 112 using a computing device 401 in communication with the compute service manager 112. The function caller 400 is a user of the cloud database system 102. The query comprises an invocation of the function defined by the function object 300 and indicates input data (e.g., a set of input rows) for the function. As an example, the query can include a statement that invokes a table function on a set of input rows.

At operation 402, the compute service manager 112, in response to receiving the query from the computing device 401 of the function caller 400, accesses information from the integration object 200 and the function object 300 to verify that the function caller 400 has appropriate usage rights to invoke the function and to verify that the target endpoint of the function (e.g., endpoint 304) is allowed based on the scheme defining allowable/restricted URLs (e.g., the whitelist and/or blacklist).

If the function caller 400 has appropriate usage rights and the target endpoint is allowed, the compute service manager 112, at operation 404, obtains the resource identifier associated with the user record 214, the resource identifier associated with the role 204, and long-term security credentials associated with the user record 214. The long-term security credentials can be encrypted to mitigate against unauthorized access and can be stored in the data store 116, a cache memory component of the compute service manager 112, or both.

At operation 406, the compute service manager 112 works in conjunction with the access management system 110 to obtain temporary security credentials for assuming the role

204. The temporary security credentials expire after a time limit is reached (e.g., 1 hour). The temporary security credentials are also limited in scope for use specifically in sending requests to the remote software component 108. The temporary security credentials can be obtained by transmitting a request to the access management system 118 of the cloud computing service platform 104 for the temporary security credentials. The request can comprise or indicate the resource identifier corresponding to the user record 214, the resource identifier corresponding to the role 204, and the long-term security credentials associated with the user record 214. The access management system 118 provides the temporary security credentials in response to the request. The temporary security credentials are also encrypted to limit unauthorized access and use.

At operation 408, the compute service manager 112 generates and provides an execution plan to the execution platform 114 that specifies data to be processed and actions to be performed. The execution plan also identifies the target endpoint 304 and the temporary security credentials to be used to authenticate with the proxy service 120. The temporary security credentials included in the execution plan are also encrypted to ensure secure communication. In generating the execution plan, external functions (e.g., scalar functions, table functions, or stored procedures) may be converted into specification and description language (SDL) nodes along with the target endpoint 304 URL and other parameters. The execution platform 114 generates a query plan based on the execution plan to extract the data consumed, and as needed, build columns that are sharded in sub-columns.

At operation 410, the execution platform 114 executes the query plan by sending one or more requests (e.g., HTTP requests) to the proxy service 120. The execution platform 114 can utilize Transport Layer Security (TLS) protocol in communicating the one or more requests to the proxy service 120. Input rows specified by the query can be batched into multiple requests to reduce the network overhead of each remote procedure call. Hence, each request can comprise a batch of input rows (e.g., a grouping of input rows). The number of batches created from the input rows can be based on a user-specified maximum batch size (e.g., included in the function definition), a maximum payload size allowed by the proxy service 120, or a maximum batch size (e.g., bytes or rows) allowed by the execution platform 114. Each request also includes metadata for performing a web call to the remote software component 108. For example, the metadata can include a batch identifier that identifies a batch of input rows included in the request In addition, the input data specified by the query can be partitioned and the partitioned data can be sent in the one or more requests. The metadata can further include a partition identifier corresponding to a partition to which the batch in the request corresponds to help identify all the batches that belong to a single partition as well as information identifying the start and the end of the partition data. Data and metadata can be passed as a combination of headers and message body, for example, in JSON, Apache Arrow, or XML, format.

Requests are electronically signed and authenticated using the temporary security credentials. At operation 412, the proxy service 120 works in conjunction with the access management system 118 to authenticate each received request and verifies that the role 204 has appropriate permissions to make web calls to the remote software component 108 corresponding to the endpoint 304. If so, the proxy service 120 processes the requests by making one or more web calls, at operation 414, to the remote software component 108, via an API to the remote software component 108 provided by the remote computing environment 106, to invoke the external functionality with respect to the set of input data. The remote software component 108 communicates result data back to the proxy service 120 in one or more responses and the proxy service 120 communicates one or more responses back to the execution platform 114, at operation 416. The result data can comprise JSON, Apache Arrow, or XML encoded data.

The execution platform 114 receives the one or more responses from the proxy service 120 and the execution platform 114 parses the responses to extract and compile the result data. The result data extracted by the execution platform 114 can comprise JSON, Apache Arrow, or XML encoded data. The execution platform 114 processes the result data according to the query plan. The processing of the result data can include storing the result data and/or performing one or more actions with respect to the result data.

In some embodiments, as part of executing the query plan, the execution platform 114 may pass data to the proxy service 120 by writing data to a first temporary data store that is commonly accessible by the cloud database system 102, the cloud computing service platform 104, and the remote computing environment 106. The data store may be provided by the cloud computing service platform 104 (e.g., AWS S3®). In these embodiments, the execution platform 114 sends one or more requests to the proxy service 120 that include an electronically signed URL corresponding to the data store and a manifest. The remote software component 108 reads data from the first temporary data store, executes the external functionality on the data, writes the result data to a second temporary data store where it can be read by the execution platform 114, and sends one or more responses back to the proxy service 120.

A process executed by the execution platform 114 cleans up the temporary data stores when a query is finished or if a query fails. Data is server-side encrypted, using a derived key specific to each query. The key may be sent in HTTP request over TLS and is used by the remote software component 108 when reading data from the temporary data stores.

In some instances, the proxy service 120 applies a hard timeout that imposes a time limit (e.g., 30 seconds) for incoming requests. This may be problematic for requests that need longer than the time limit to execute such as external table functions. To support these scenarios, the execution platform 114 may, in some embodiments, use an asynchronous model where a single logical request is implemented as a state machine with the following states: 1) begin request; 2) poll status; and 3) read results. In this manner, after beginning a request, the execution platform 114 may proceed to poll the proxy service 120 for a status of the request and continue to do so until the result data is ready. In some embodiments, the execution platform 114 utilizes a webhook-style callback mechanism to address the hard timeout imposed by the proxy service 120.

In some instances, the temporary credentials can expire during a web call to the remote software component 108 or while waiting for the response from the proxy service 120. In these instances, the execution platform 114 can work in conjunction with the compute service manager 112 to refresh the temporary security credentials and upon refreshing the temporary security credentials, communicate additional requests to the web endpoint 304.

In some instances, the proxy service 120 imposes payload size limitations for requests and responses (e.g., 10 MB).

Such payload size limitations can be problematic for queries against large tables. The cloud database system 102 supports pagination of result data to handle these payload size limitations. As an example, responses received from the remote software component 108 via the proxy service 120 can include a pagination token to indicate whether additional result data is available (e.g., additional pages of result data). In response to detecting a pagination token in a response, the execution platform 114 may send one or more additional requests (e.g., HTTP GET requests) to the remote software component 108 via the proxy service 120. The execution platform 114 may continue to send the requests until a response is received without a pagination token or with some other indicator that no additional result data is available at the remote software component 108.

Figure 5:
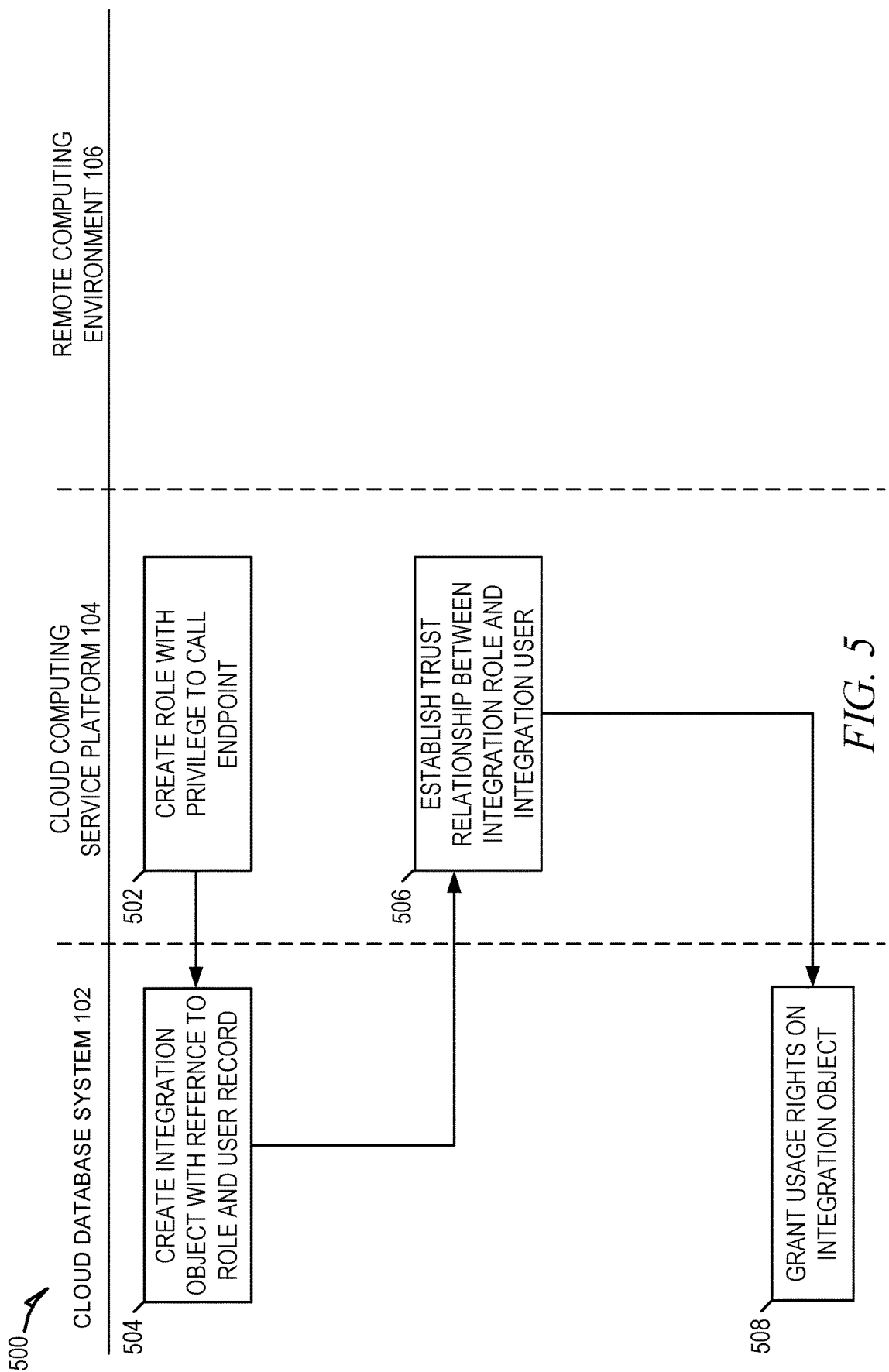
FIG. 5 is an interaction diagram illustrating interactions between components in the computing environment in creating an integration object, in accordance with some embodiments of the present disclosure.

FIG. 5 is an interaction diagram illustrating interactions between the cloud database system 102, the cloud computing service platform 104, and the remote computing environment 106 in performing a method 500 for creating an integration object (e.g., the integration object 200), in accordance with some embodiments of the present disclosure.

At operation 502, the cloud computing service platform 104 creates the role 204 with permission to call the endpoint 304 corresponding to the remote software component 108. The cloud computing service platform 104 creates the role 204 based on input received from the computing device 203 operated by the administrative user 202. For example, the administrative user 202 can utilize a user interface provided to computing device 203 by the cloud computing service platform 104 to provide appropriate input to cause the access management system 118 to create the role 204. The cloud computing service platform 104 assigns a resource identifier to the role 204 once the role 204 has been generated, and in an out-of-band communication the administrative user 202 communicates the resource identifier to the administrative user 206 of the cloud database system 102.

At operation 504, the compute service manager 112 creates the integration object 200 in the data store 116 based on input provided by the administrative user 206 (e.g., via a UI provided to computing device 207 by the cloud database system 102). The input provided by the administrative user 206 includes the resource identifier associated with the role 204 and data defining a scheme for allowing/denying web calls based on target URLs. The integration object 200 generated by the compute service manager 112 includes: the reference 210 to the resource identifier associated with the role 204, the reference 212 to a resource identifier associated with the user record 214, and the data defining the scheme. In some embodiments, the integration object 200 may further comprise a reference to an external ID string generated by the compute service manager 112.

The administrative user 206 extracts the resource identifier of the user record 214 and, in some embodiments, the external ID string included in the integration object 200 and communicates the resource identifier of the user record 214 and the external ID string to the administrative user 202 in an out-of-band communication.

At operation 506, the cloud computing service platform 104 establishes a trust relationship between the role 204 and the user record 214 based on input from the administrative user 202 including the resource identifier of the user record 214 and, in some embodiments, the external ID string. The cloud computing service platform 104 establishes the trust relationship to enable a user corresponding to the user record 214 to assume the role 204 and send web calls to the remote software component 108 via the proxy service 120. As part of establishing the trust relationship, the role 204 is updated to include a reference 216 to the user record 214 and the external ID string, in some embodiments.

At operation 508, the compute service manager 112 grants usage rights to the integration object 200 to one or more users associated with the administrative user 206 based on input provided by the administrative user 206 via the UI provided to computing device 207.

Figure 6:
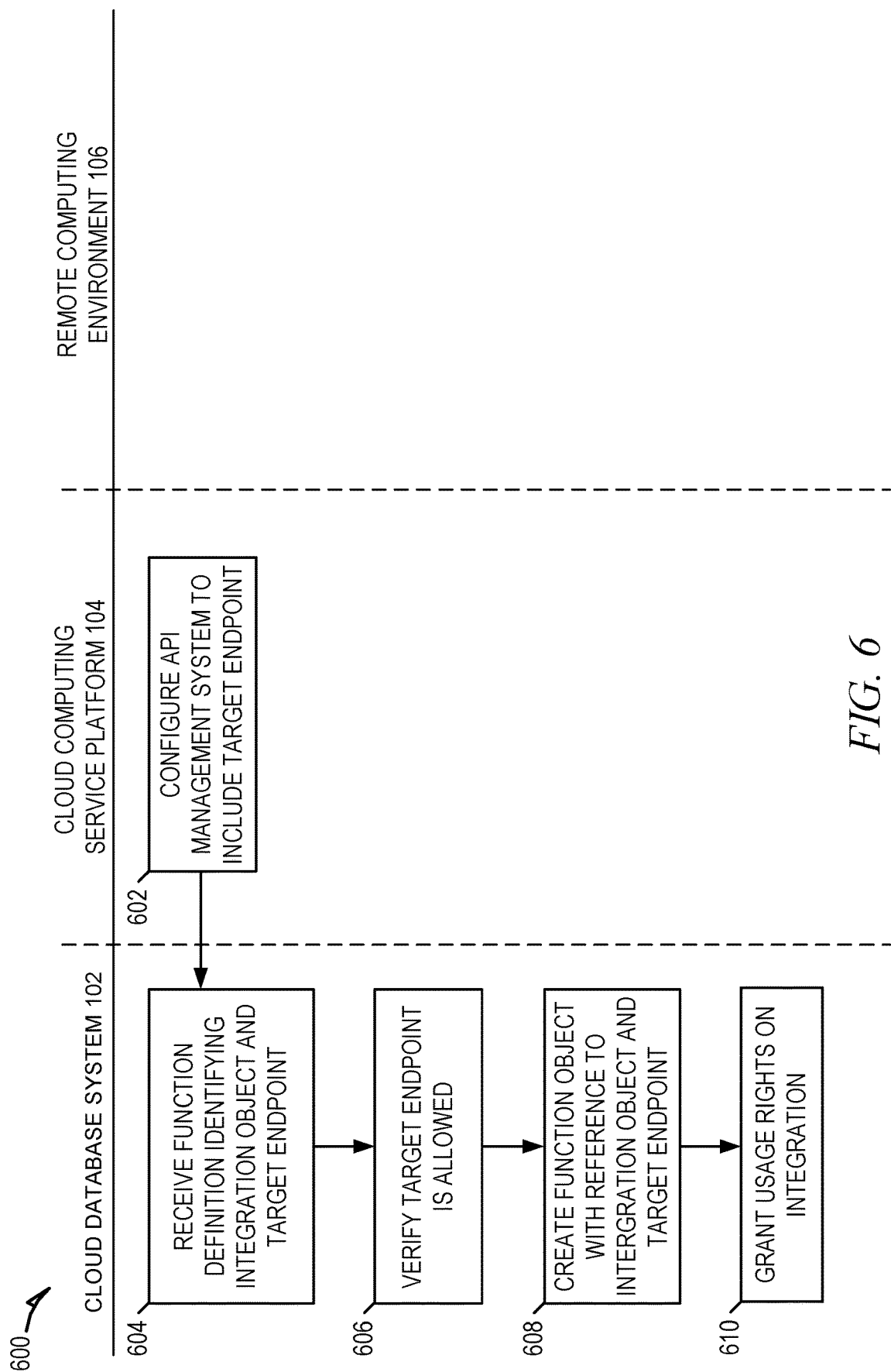
FIG. 6 is an interaction diagram illustrating interactions between components in the computing environment in creating a function object, in accordance with some embodiments of the present disclosure.

FIG. 6 is an interaction diagram illustrating interactions between cloud database system 102, the cloud computing service platform 104, the remote computing environment 106 in creating the function object 300, in accordance with some embodiments of the present disclosure. At operation 602, the proxy service 120 is configured by the function author 306 to include the target endpoint 304 corresponding to the remote software component 108. The function author 306 can configure the proxy service 120 using a UI provided to computing device 307 by the cloud computing service platform 104.

At operation 604, the compute service manager 112 receives, from the computing device 307, a function definition that includes an identifier of the integration object 200 and the target endpoint 304 (e.g., a URL). The function definition can be specified by the function author 306 using a UI provided to the computing device 307 by the cloud database system 102. The target endpoint 304 corresponds to an external function such as a scalar or table function that can be used in a query (e.g., SQL query). In the example of a scalar function, the function definition can specify that one or more input parameters are provided and a single value is returned for each input parameter. In the example of a table function, the function definition can specify that zero or more rows can be returned for each input row provided.

At operation 606, the compute service manager 112 verifies whether the target endpoint is allowed by the scheme defining allowable/restricted URLs. If it is not allowed, the compute service manager 112 rejects the function definition. Otherwise, the compute service manager 112, at operation 608, creates the function object 300 in the data store 116 that defines a function that can be used in a query (e.g., SQL query) to invoke the external functionality provided by the remote software component 108. The function object 300 comprises the reference 308 (e.g., a pointer) to the integration object 200 and the reference 314 (e.g., a pointer) to the target endpoint 304. At operation 610, the compute service manager 112 grants usage rights to the function object 300 to one or more users associated with the function author 306 based on input provided by the function author 306 via the UI provided to computing device 307.

Figure 7:
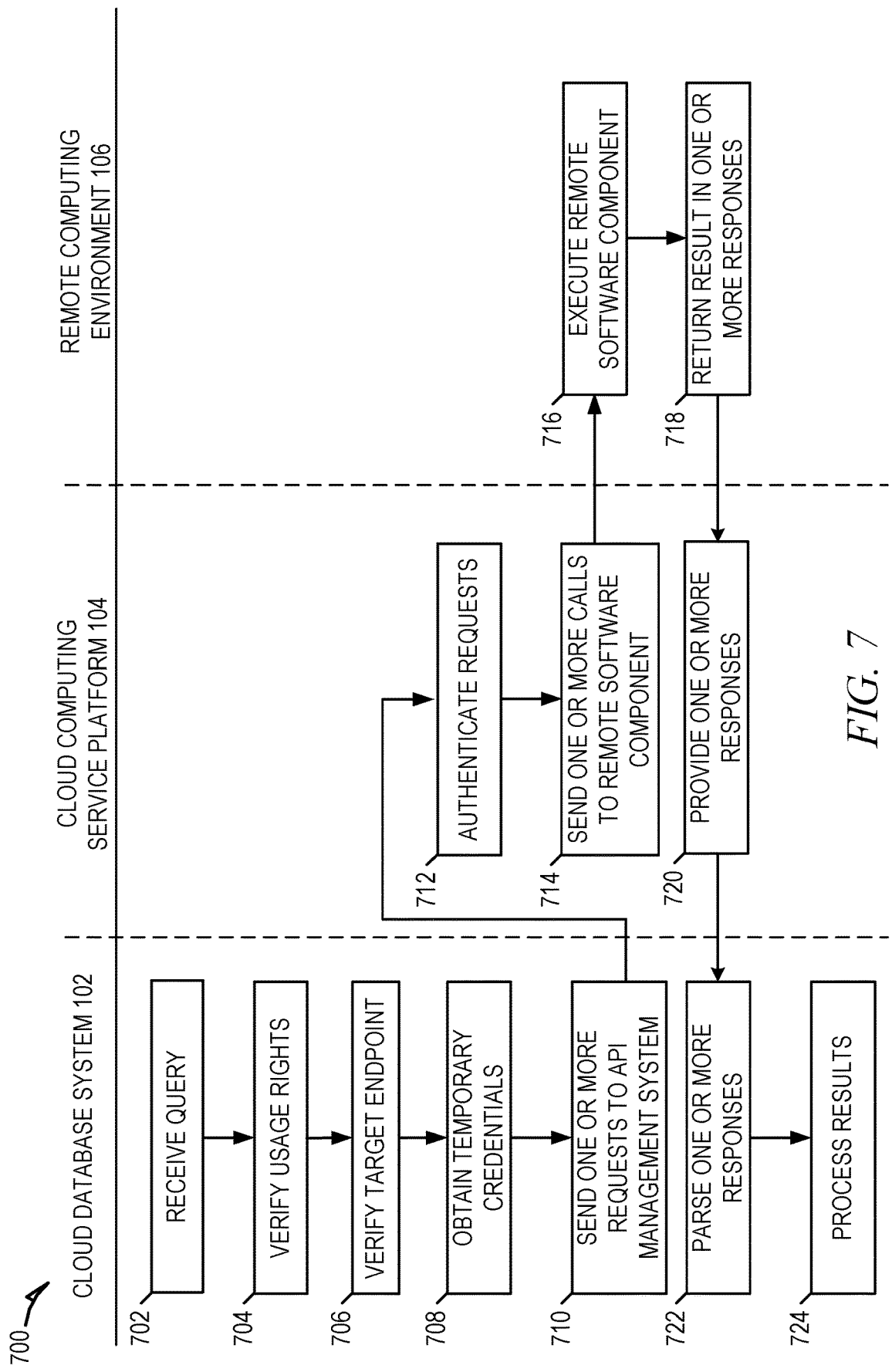
FIG. 7 is an interaction diagram illustrating interactions between components in the computing environment in invoking external functionality provided by the remote software component, in accordance with some embodiments of the present disclosure.

FIG. 7 is an interaction diagram illustrating interactions between components of cloud database system 102, the cloud computing service platform 104, and the remote computing environment 106 in invoking external functionality provided by remote software component 108, in accordance with some embodiments of the present disclosure.

At operation 702, the cloud database system 102 receives a query from the computing device 401 operated by function caller 400. The query comprises an invocation of the external function corresponding to the function object 300 and indicates input data (e.g., a set of input rows) for the function. In response to receiving the query, the cloud database system 102 verifies, at operation 704, that the function caller 400 has appropriate usage rights to invoke the function. At operation 706, the cloud database system 102 verifies that the target endpoint of the function (e.g., endpoint 304) referenced in the query is allowed based on the scheme defining allowable/restricted URLs (e.g., the whitelist and/or blacklist).

If the function caller 400 has appropriate usage rights and the target endpoint is allowed, the compute service manager 112 obtains temporary security credentials for assuming the role 204, at operation 708. The temporary security credentials can be obtained by transmitting a request to the access management system 118 of the cloud computing service platform 104 for the temporary security credentials. The request can comprise or indicate the resource identifier corresponding to the user record 214, the resource identifier corresponding to the role 204, and the long-term security credentials associated with the user record 214.

At operation 710, the cloud database system 102 sends one or more requests (e.g., HTTP requests) to the proxy service 120 of the cloud computing service platform 104 (e.g., using TLS protocol). Each request can comprise a batch of input rows as well as other metadata such as a batch identifier to identify the batch and a partition identifier to identify a partition to which the batch belongs. In addition, a request may include an indicator to identify the beginning or the end of a partition. The indicator of the beginning of a partition can be used by the remote computing component 108 to initialize any data structure or storage device used to process a partition, and the indicator of the end of a partition can be used in finalizing the result of the partition.

The proxy service 120 works in conjunction with the access management system 118 of the cloud computing service platform 104 to authenticate each received request at operation 712. At operation 714, the proxy service 120 of the cloud computing service platform 104 processes the request by sending one or more web calls to the remote software component 108, via an API to the remote software component 108 provided by the remote computing environment 106, to invoke the external functionality with respect to the input data.

At operation 716, the remote computing environment 106 executes the remote software component 108 with the input data provided as input and in doing so, the remote computing environment 106 generates result data (e.g., in JSON, Apache Arrow, or XML format). The remote computing environment 106 communicates result data back to the proxy service 120 in one or more responses, at operation 718. At operation 720, the proxy service 120 communicates one or more responses back to the execution platform 114 that collectively comprise the result data (e.g., in JSON, Apache Arrow, or XML format).

In some embodiments, the result data is paginated, and responses can include a pagination token (e.g., in a header of the response) to indicate when additional pages of results data are to be obtained from the remote software component 108. Consistent with these embodiments, based on a pagination token being included in a response, the cloud database system 102 may wait for one or more additional responses from the proxy service 120 before performing downstream processing, or the cloud database system 102 may send one or more additional requests (e.g., HTTP GET requests) to the proxy service 120 to obtain the additional pages of input data. Any one or more of the additional requests can include the pagination token.

The cloud database system 102 parses the one or more responses, at operation 722, to extract and compile the result data (e.g., in JSON, Apache Arrow, or XML format). At operation 724, the execution platform 114 processes the result data (e.g., by storing the result data and/or performing one or more actions with respect to the result data).

In some embodiments, the cloud database system 102, the cloud computing service platform 104, and/or the remote computing environment 106 can utilize a handshake protocol to exchange metadata that describes information associated with processing the query before the cloud database system 102 sends the one or more requests, at operation 710. The metadata can be used by each system to configure a degree of parallelism and otherwise optimize query processing. For example, the cloud database system 102 can, based on the metadata, send multiple parallel requests to ingest table data from the remote computing environment 106 in multiple streams. The metadata can, for example, include information describing properties of expected result data including a maximum number of rows, a maximum size, data types, and the like. The metadata can further include information specifying a number of parallel calls supported by proxy service 120 and/or the remote software component 108. This handshake protocol can further aid in determining join orders for queries with external table functions.

Figure 8:
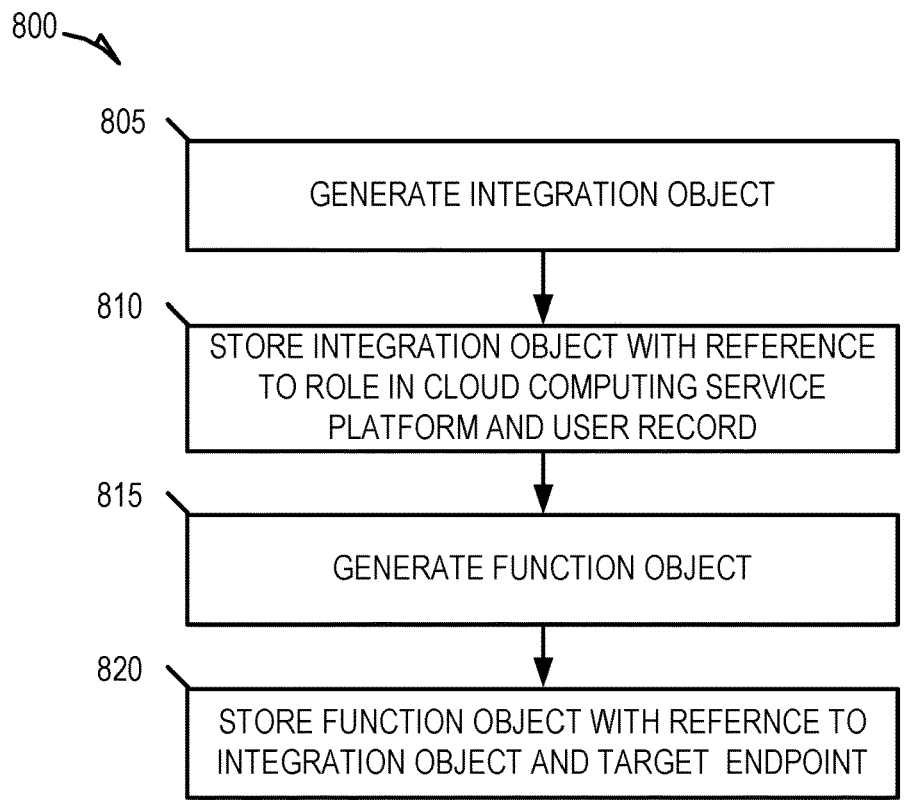
FIG. 8 is a flow diagram illustrating operations of the cloud database system in performing a method for enabling a cloud database system to invoke external functionality provided by the remote software component, in accordance with some embodiments of the present disclosure.
Figure 9:
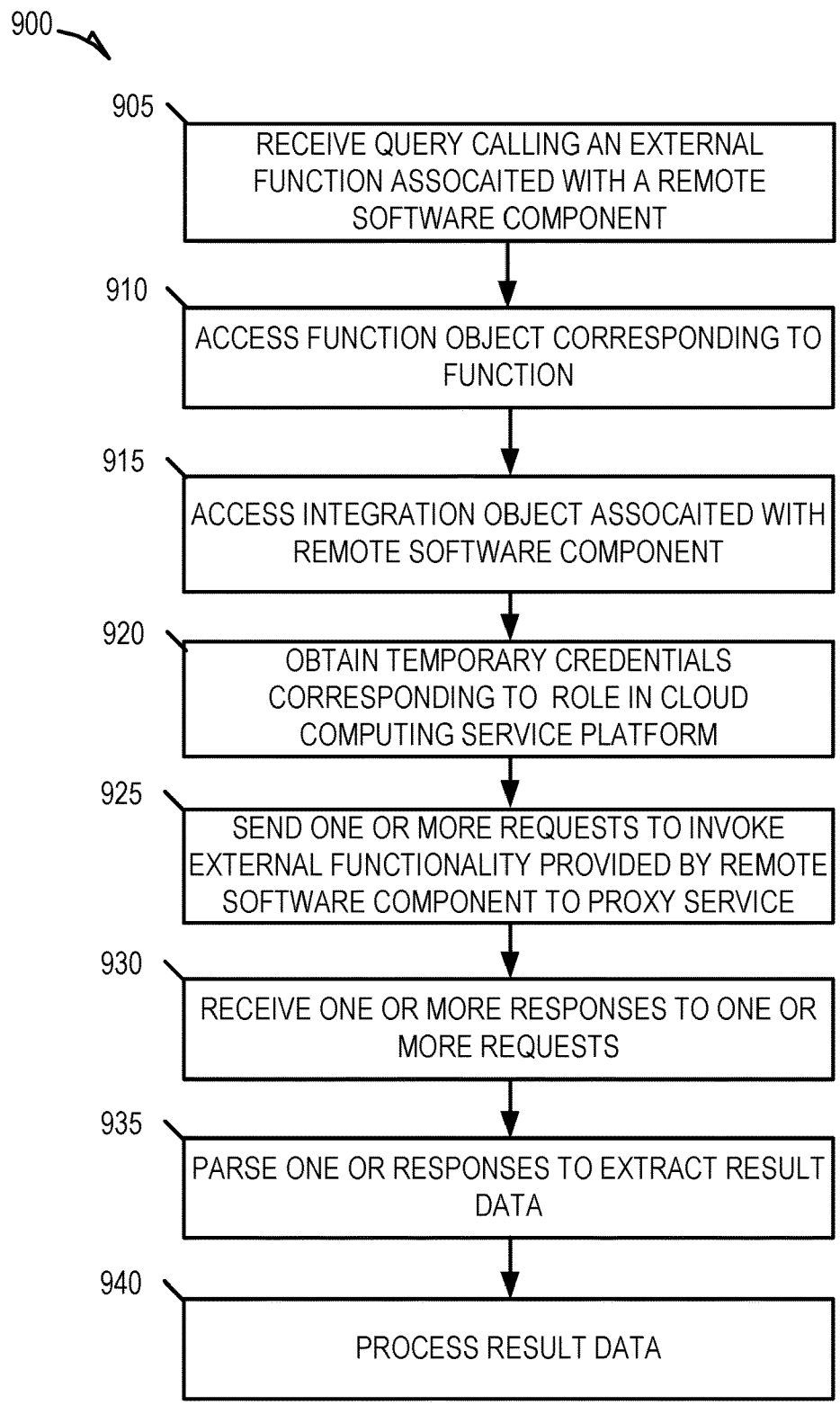
FIGS. 9-14 are flow diagrams illustrating operations of the cloud database system in performing a method for invoking external functionality provided by the remote software component, in accordance with some embodiments of the present disclosure.

FIG. 8 is a flow diagram illustrating operations of the cloud database system 102 in performing a method 800 for enabling a cloud database system 102 to invoke an external function provided by the remote software component 108, in accordance with some embodiments of the present disclosure. The method 800 may be embodied in computer-readable instructions for execution by a hardware component (e.g., a processor) such that the operations of the method 800 may be performed by components of cloud database system 102. Accordingly, the method 800 is described below, by way of example with reference thereto. However, it shall be appreciated that the method 800 may be deployed on various other hardware configurations and is not intended to be limited to deployment within the cloud database system 102.

At operation 805, the compute service manager 112 generates an integration object (e.g., integration object 200) based on first input received from a first computing device (e.g., computing device 207) corresponding to a first user (e.g., user 206) of the cloud database system 102. The first user can, for example, provide the input using a UI provided to the computing device by the cloud database system 102. The input comprises a first resource identifier corresponding to a role (e.g., role 204) in the cloud computing service platform 104 and a scheme defining allowable/restricted URLs to which web calls may be sent (e.g., a whitelist and/or blacklist of URLs). The first resource identifier can be communicated to the first user by an administrative user of the cloud computing service platform 104 (e.g., the administrative user that created the role).

As part of generating the integration object, the compute service manager 112 identifies a second resource identifier corresponding to a user record (e.g., user record 214) maintained by the access management system 110 of the cloud database system 102 to assign to the integration. In some embodiments, the compute service manager 112 also generates an external ID string that can be used to establish a trust relationship between the role in the cloud computing service platform 104 and the user record. Further, the compute service manager 112 can also grant usage rights to the integration to one or more users (e.g., users specified by the administrative user of the cloud database system).

The integration object comprises: a reference to the first resource identifier corresponding to the role in the cloud computing service platform 104, a reference to the second resource identifier corresponding to a user record maintained by the cloud database system 102, data defining a scheme for allowing/denying web calls based on target URLs, and, in some embodiments, a reference to the external ID string. The administrative user of the cloud database system can communicate the second resource identifier and the external ID string to the administrative user of the cloud computing service platform 104 and the administrative user of the cloud computing service platform can in turn create the trust relationship between the role and the user record.

At operation 810, the compute service manager 112 stores the integration object in the data store 116 along with a reference to the user record maintained by the access management system 110 and a reference to the role maintained by the cloud computing service platform 104. For example, the compute service manager 112 can store the integration object with a first pointer corresponding to the user record and a second pointer corresponding to the role.

At operation 815, the compute service manager 112 generates a function object (e.g., function object 300) based on second input received from a second computing device (e.g., computing device 203) corresponding to a second user (e.g., function author 306) of the cloud database system 102. The function object corresponds to an external function provided by the remote software component 108 such as a scalar function or a table function. The function object comprises a reference to the integration object and a reference to a target endpoint (e.g., target endpoint 304) corresponding to the remote software component 108. The second input can identify the target endpoint and the integration object. For example, the second input can include a URL corresponding to the target endpoint and a resource identifier corresponding to the integration object. Prior to generating the function object, the compute service manager 112 verifies that the target endpoint is allowed by comparing the target endpoint to the scheme that defines allowable/restricted URLs.

At operation 820, the compute service manager 112 stores the function object with a reference to the integration object and reference to the target endpoint in the proxy service 120. For example, the compute service manager 112 can store the function object with a first pointer corresponding to the integration object and a second pointer corresponding to the target endpoint in the proxy service 120.

FIGS. 9-14 are flow diagrams illustrating operations of the cloud database system 102 in performing a method 900 for invoking external functionality provided by remote software component 108, in accordance with some embodiments of the present disclosure. The method 900 may be embodied in computer-readable instructions for execution by a hardware component (e.g., a processor) such that the operations of the method 900 may be performed by components of cloud database system 102. Accordingly, the method 900 is described below, by way of example with reference thereto. However, it shall be appreciated that the method 900 may be deployed on various other hardware configurations and is not intended to be limited to deployment within the cloud database system 102.

In some embodiments, the method 900 is performed subsequent to the method 800 where the cloud database system 102 enables invocation of the external functionality by generating and storing the integration object and function object. Consistent with these embodiments, the method 900 includes the operations 805, 810, 815, and 820 of the method 800.

At operation 905, the compute service manager 112 receives a query from a computing device of a third user (e.g., function caller 400) that comprises a reference to an external function associated with the remote software component 108. As an example, the remote software component 108 may comprise a scalar function, a table function, or a stored procedure. The query further indicates input data for the function. In the example of a table function, the input data can include a set of input rows or partitions from a table.

At operation 910, the compute service manager 112 accesses a function object (e.g., the function object 300) corresponding to the function based on the reference to the function included in the query. The function object is stored with an association (e.g., a pointer) to an integration object associated with the remote software component 108, and the compute service manager 112 uses this information in the function object to identify the integration object.

At operation 915, the compute service manager 112 accesses the integration object (e.g., integration object 200) from the data store 116 based on the association with the function object. The integration object includes a reference to a user record maintained by the access management system 110 and a reference to a role (e.g., role 204) maintained by the access management system 118 of the cloud computing service platform 104.

At operation 920, the compute service manager 112 obtains temporary security credentials to be used in authenticating with the proxy service 120 to assume the role in the cloud computing service platform 104. The temporary security credentials expire after a time limit is reached (e.g., 1 hour) and are limited in scope for use specifically in invoking external functionality provided by the remote software component 108.

At operation 925, the execution platform 114 sends one or more requests (e.g., one or more HTTP POST commands) to the proxy service 120 of the cloud computing service platform 104 to invoke the external functionality provided by the remote software component 108. Each of the one or more requests comprises input data (e.g., a set of input rows) and a reference to the target endpoint corresponding to the remote software component 108. Each request can be electronically signed using the temporary security credentials.

As noted above, input rows in the input data can be grouped into multiple batches and each request can include a batch of input rows. The number of batches (and thus the number of requests sent to the proxy service 120) can be based on a maximum batch size supported by the proxy service 120, a user-defined maximum batch size, or a maximum batch size supported by the remote software component 108. Each request includes a batch identifier corresponding to the batch of input rows included in the request. Each request may further specify a partition identifier that identifies a partition to which the batch of input rows in the requests belongs.

The one or more requests are authenticated by the access management system 118 and cause the proxy service 120 to invoke the external functionality provided by the remote software component 108. For example, a request may cause the proxy service 120 to send one or more web calls to the remote software component 108 (e.g., via an API provided by the remote computing environment 106). The remote software component 108, in turn, executes a scalar function, tabular function, or procedure and generates result data based thereon. The remote software component 108 communicates the result data back to the proxy service 120 in one or more responses (e.g., in one or more HTTP responses). The proxy service 120 communicates the one or more responses to the request to the execution platform 114. The result data can comprise JSON, Apache Arrow, or XML encoded data.

The remote software component 108 returns a result batch of rows for each batch of input rows received. For an external table function, the number of rows in each returned batch is equal to the number of rows in the received batch of rows. For external table functions, zero or more rows can be returned for each row in the batch.

At operation 930, the execution platform 114 receives the one or more responses from the proxy service 120. Each response includes at least a portion of the result data and can include a batch identifier identifying the batch of input rows to which the portion corresponds. Each response can further include a partition identifier to identify the partition to which the corresponding batch belongs.

A response from the proxy service 120 can include a pagination token (e.g., in a header of the response) that indicates that there is additional result data (e.g., an additional page) to be provided by the remote software component 108. In some embodiments, when a response with a pagination token is received, the execution platform 114 may wait for the additional result data (e.g., the additional page) to be provided by the remote software component 108 via the proxy service 120. In some embodiments, when a response with a pagination token is received, the execution platform 114 sends one or more additional requests (e.g., HTTP GET requests) to the proxy service 120 to obtain the additional result data provided by the remote software component 108. Each of the additional requests can include a page number corresponding to the additional result data.

The execution platform 114 parses the one or more responses to extract and compile the result data, at operation 935. The result data extracted by the execution platform 114 can comprise JSON, Apache Arrow, or XML encoded data.

At operation 940, the execution platform 114 processes the result data. The processing of the result data can include storing the result data and/or performing one or more actions with respect to the result data.

Figure 10:
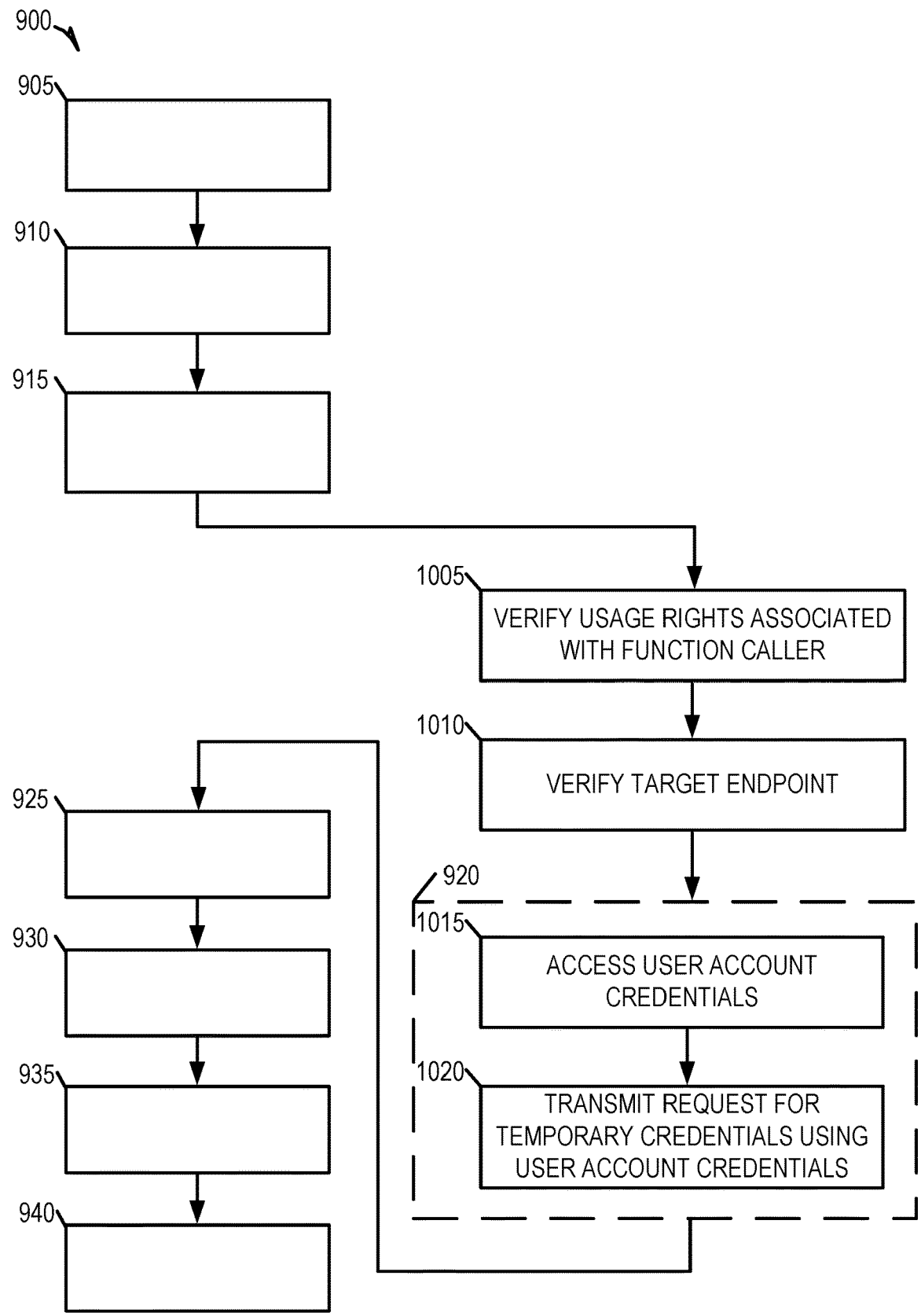

As shown in FIG. 10, the method 900 may, in some embodiments, further include operations 1005, 1010, 1015, and 1020. Consistent with these embodiments, the operations 1005 and 1010 are performed subsequent to operation 915 wherein the compute service manager 112 accesses the integration object. At operation 1005, the compute service manager 112 verifies that the third user (e.g., the function caller 400) has usage rights to utilize the integration based on usage rights indicated by the integration object. At operation 1010, the compute service manager 112 verifies that the target endpoint included in the query is allowed based on a comparison of the target endpoint with the scheme that defines allowable/restricted URLs indicated by the integration object.

Consistent with these embodiments, the operations 1015 and 1020 may be performed as part of operation 920 (e.g., as sub-operation or a sub-routine), where the compute service manager 112 obtains temporary security credentials to assume the cloud computing service platform 104 role.

At operation 1015, the compute service manager 112 accesses long-term security credentials associated with the user record in the database system 102. The long-term security credentials can be stored in an encrypted format in the database and/or a cache memory component of the compute service manager 112.

At operation 1020, the compute service manager 112 transmits a request to the access management system 118 of the cloud computing service platform 104 for the temporary security credentials. The request can comprise or indicate the first resource identifier corresponding to the user record in the cloud database system 102, the second resource identifier corresponding to the cloud computing services platform role, and the long-term security credentials associated with the user record. The access management system 118 of the cloud computing service platform 104 provides the temporary security credentials in response to the request.

Figure 11:
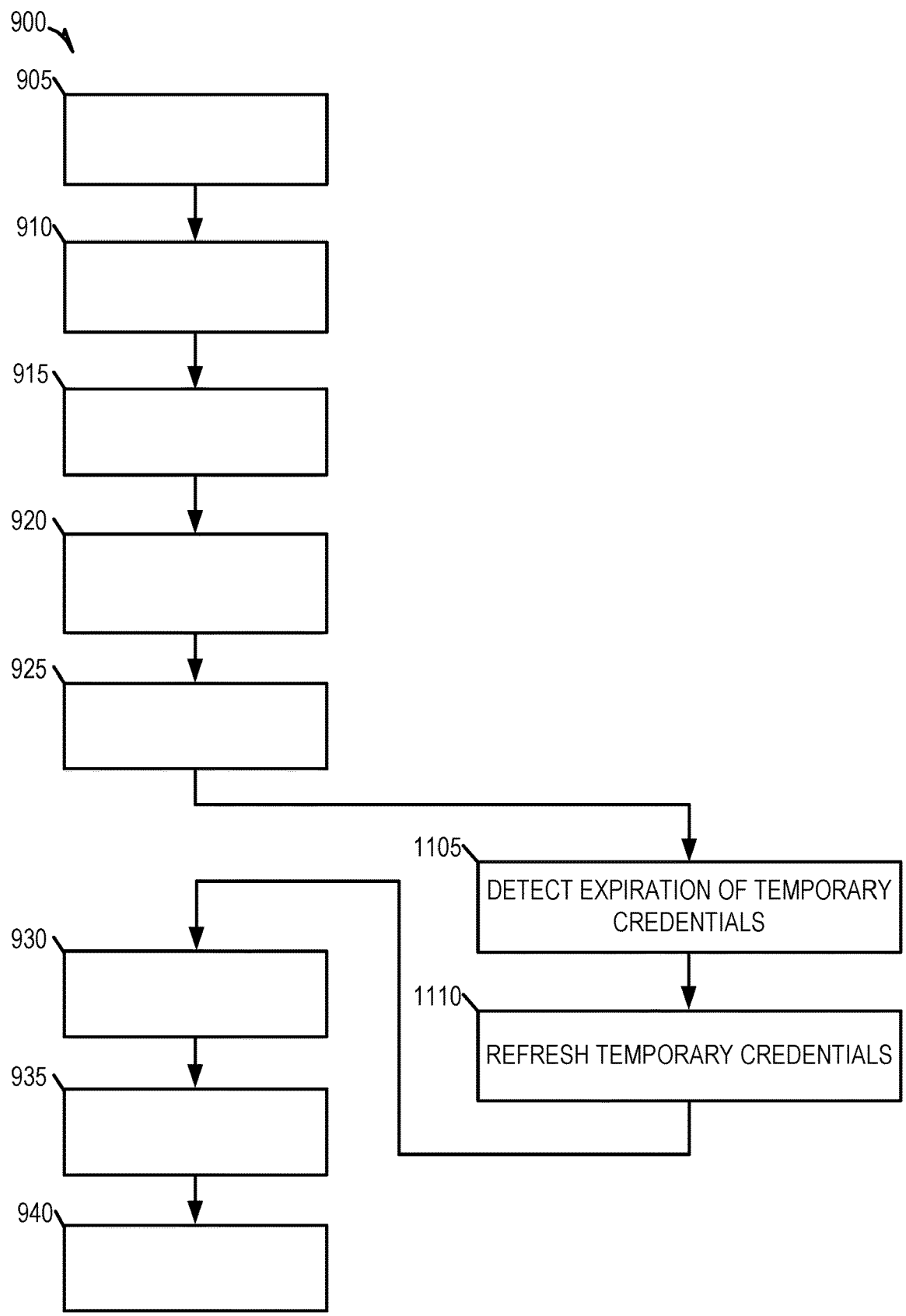

As shown in FIG. 11, the method 900 may, in some embodiments, include operations 1105 and 1110. Consistent with these embodiments, the operations 1105 and 1110 may be performed prior to operation 930 where the execution platform 114 receives the response from the proxy service 120. At operation 1105, the execution platform 114 detects an expiration of the temporary security credentials. For example, the execution platform 114 can detect the expiration of the temporary security credentials based on determining the expiration time limit has been reached or based on a timeout message received from the cloud computing service platform 104. In some embodiments, the execution platform 114 may poll the proxy service 120 for a status of the request and detect the expiration of the temporary credentials based on a response thereto.

At operation 1110, the compute service manager 112 refreshes the temporary security credentials to enable the execution platform 114 to continue assuming the role. For example, the compute service manager 112 can refresh the temporary security credentials by sending an additional request to the access management system 118 of the cloud computing service platform 104. Upon refreshing the security credentials, the compute service manager 112 may prompt the execution platform 114 to send one or more additional requests to the proxy service 120 to invoke the external functionality provided by the remote software component 108. In some instances, the compute service manager 112 may refresh the temporary security credentials to ensure that the proxy service 120 is able to communicate the response back to the execution platform 114.

Figure 12:
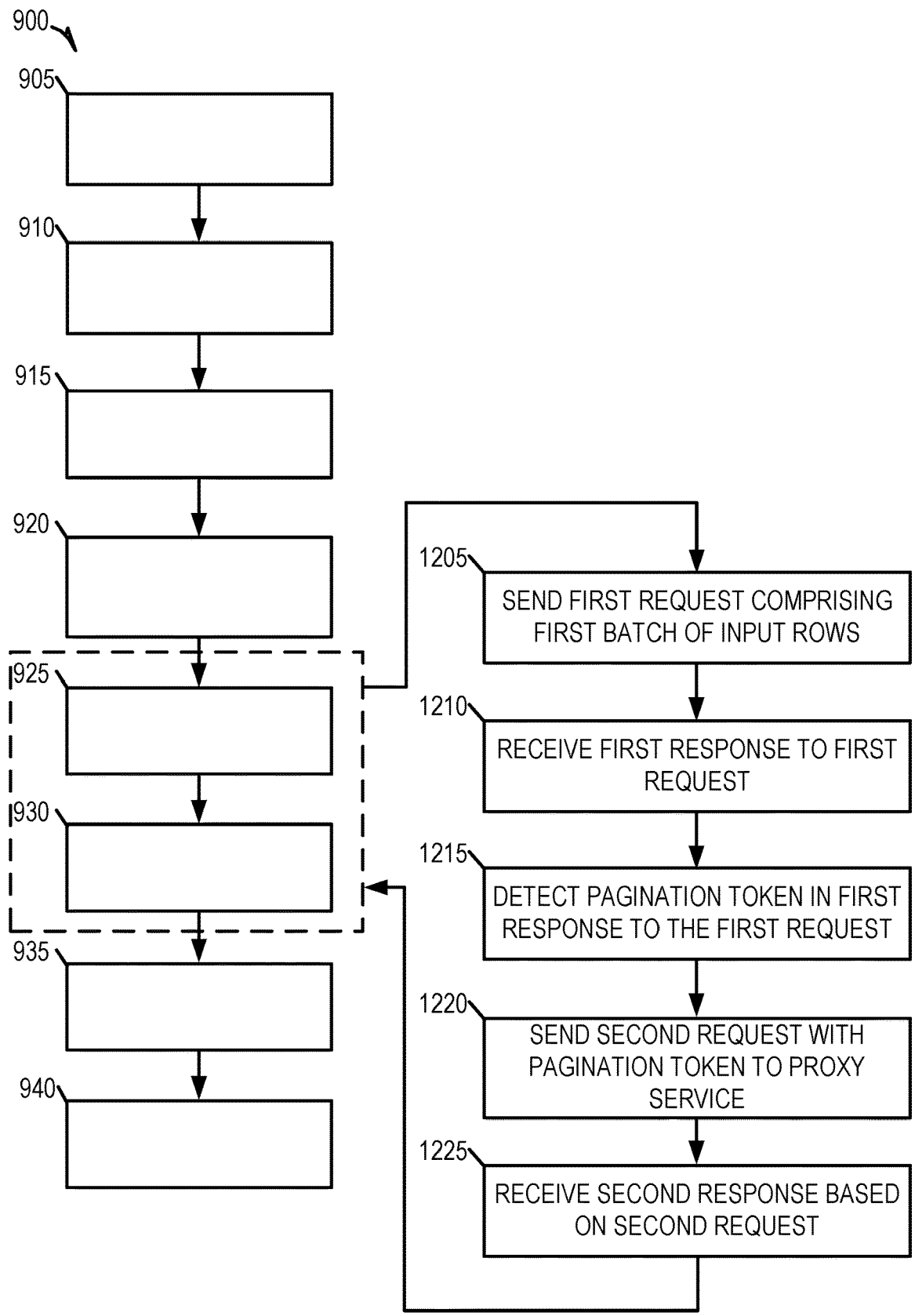

As shown in FIG. 12, the method 900 may, in some embodiments, include operations 1205, 1210, 1215, 1220, and 1225. The operations 1205, 1210, 1215, 1220, and 1225 can be performed as part of the operations 925 and 930 where the execution platform 114 sends one or more requests and receives one or more responses.

At operation 1205, the execution platform 114 sends a first request (e.g., an HTTP request) to the proxy service 120. The first request comprises a first batch of input rows along with an identifier of the first batch. A first response to the first request is received from the proxy service 120, at operation 1210. The first response includes a first portion of the result data (e.g., a first page). The first response also includes a pagination token that indicates that there is an additional portion of result data (e.g., a second page) corresponding to the first batch of input rows available from the remote software component 108.

Based on detecting the pagination token in the first response (at operation 1215), the execution platform 114 sends a second request (e.g., an HTTP GET request) to the proxy service 120 that causes the proxy service 120 to return a second portion of the result data (e.g., a second page) in a second response. The second request includes the pagination token. The execution platform 114 receives the second response, at operation 1225. The second response includes the second portion of the result data (e.g., the second page). Although it is not shown in FIG. 12, the execution platform 114 may continue to send requests to the proxy service 120 as long as the responses include a pagination token. The execution platform 114 may stop sending requests upon receiving a response that indicates no further portions of result data are available.

Figure 13:
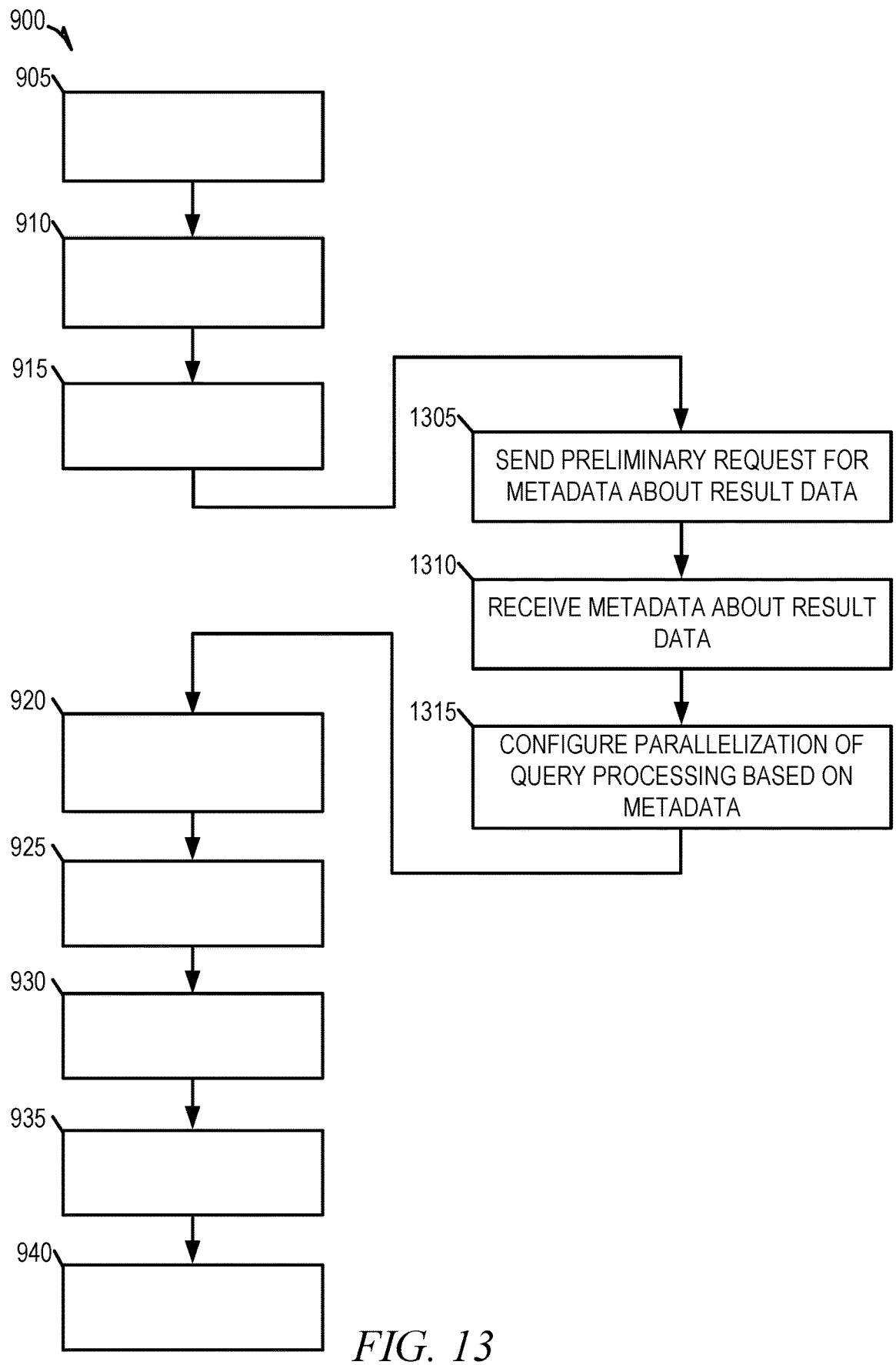

As shown in FIG. 13, the method 900 may, in some embodiments, include operations 1305, 1310, and 1315. The operations 1305, 1310, and 1315 can be performed prior to operation 925 where the execution platform 114 sends one or more requests to the proxy service 120.

At operation 1305, the compute service manager 112 sends a preliminary request (e.g., an HTTP request) for metadata associated with query processing to the proxy service 120. The compute service manager 112 can also send metadata about the query to the proxy service 120 either as part of the request or as part of another message sent to the proxy service 120. In response to receiving the preliminary request from the compute service manager 112, the proxy service 120 can exchange one or more messages with the remote software component 108 to obtain at least a portion of the metadata.

The compute service manager 112, at operation 1310, receives the metadata from the proxy service 120. The metadata can include information from the remote software component 108, the proxy service 120, or a combination of both. The metadata can, for example, include information describing properties of expected result data including a maximum number of rows, a maximum size, data types, and the like. The metadata can further include an indicator of a degree of parallelism to which the query can be executed such as a number of parallel calls supported by proxy service 120 and/or the remote software component 108.

At operation 1315, the compute service manager 112 configures parallelism parameters based on the metadata. The parallelism parameters control a degree of parallelism of query processing. For example, in configuring the parallelism parameters, the compute service manager 112 can determine a number of parallel calls to perform (e.g., a number of requests to send to the proxy service 120 in parallel) to invoke the external function on batches of input rows.

Figure 14:
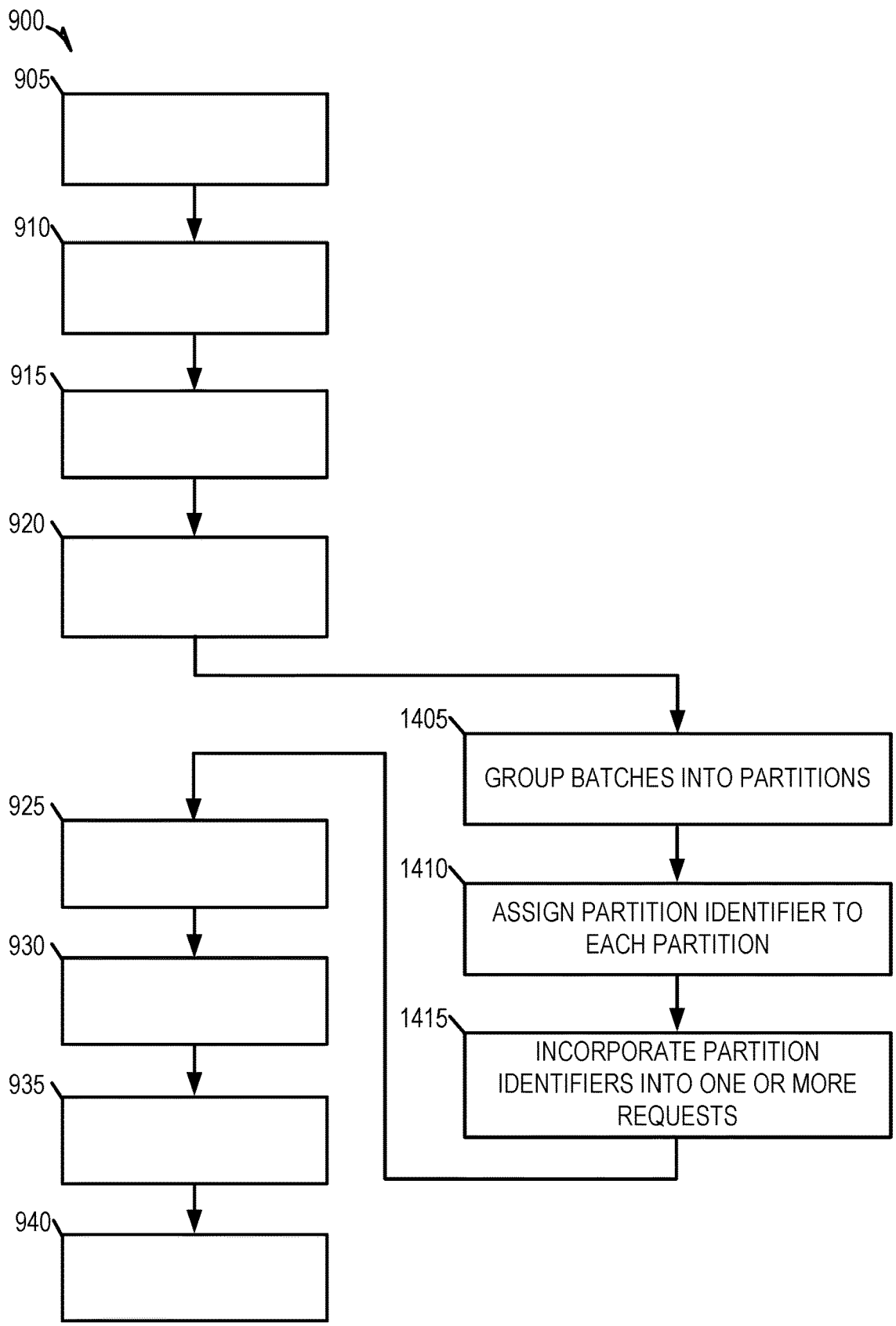

As shown in FIG. 14, the method 900 may, in some embodiments, include operations 1405, 1410, and 1415. The operations 1405, 1410, and 1415 can be performed prior to operation 925 where the execution platform 114 sends one or more requests to the proxy service 120.

At operation 1405, the compute service manager 112 groups batches of input rows included in the query into a set of partitions, and at 1410, the compute service manager 112 assigns a partition identifier to each partition in the set. The execution platform 114 incorporates the partition identifiers into the one or more requests, at operation 1415, prior to sending the requests to the proxy service 120. That is, each request sent to the proxy service 120 can include a partition identifier that identifies which partition the one or more batches of input rows in the request belong to. For example, partition identifiers can be added to a header of the requests. Consistent with these embodiments, each of the one or more responses received from the remote software component 108 can also include a partition identifier to identify which partition the included result data corresponds to.

Figure 15:
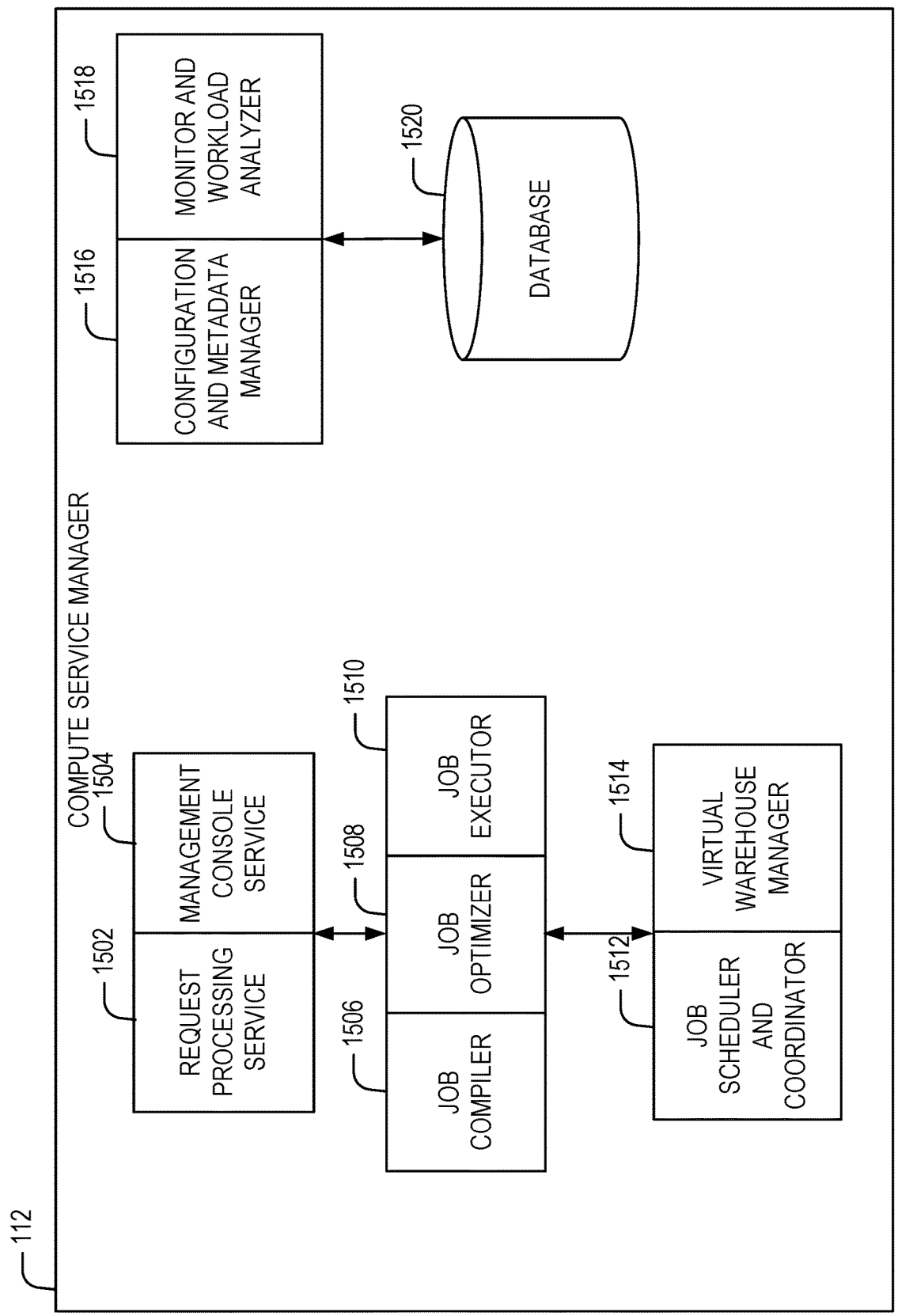
FIG. 15 is a block diagram illustrating components of a compute service manager, in accordance with some embodiments of the present disclosure.

FIG. 15 is a block diagram illustrating components of the compute service manager 112, in accordance with some embodiments of the present disclosure. As shown in FIG. 15, request processing service 1502 manages received data storage requests and data retrieval requests (e.g., jobs to be performed on database data). For example, the request processing service 1502 may determine the data necessary to process a received query (e.g., a data storage request or data retrieval request). The data may be stored in a cache within the execution platform 114 or in a data storage device in cloud computing service platform 104. A management console service 1504 supports access to various systems and processes by administrators and other system managers. Additionally, the management console service 1504 may receive a request to execute a job and monitor the workload on the system.

The compute service manager 112 also includes a job compiler 1506, a job optimizer 1508, and a job executor 1510. The job compiler 1506 parses a job into multiple discrete tasks and generates the execution code for each of the multiple discrete tasks. The job optimizer 1508 determines the best method to execute the multiple discrete tasks based on the data that needs to be processed. The job optimizer 1508 also handles various data pruning operations and other data optimization techniques to improve the speed and efficiency of executing the job. The job executor 1510 executes the execution code for jobs received from a queue or determined by the compute service manager 112.

A job scheduler and coordinator 1512 sends received jobs to the appropriate services or systems for compilation, optimization, and dispatch to the execution platform 114. For example, jobs may be prioritized and processed in that prioritized order. In an embodiment, the job scheduler and coordinator 1512 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 1512 identifies or assigns particular nodes in the execution platform 114 to process particular tasks. A virtual warehouse manager 1514 manages the operation of multiple virtual warehouses implemented in the execution platform 114. As discussed below, each virtual warehouse includes multiple execution nodes that each include a cache and a processor.

Additionally, the compute service manager 112 includes a configuration and metadata manager 1516, which manages the information related to the data stored in the remote data storage devices and in the local caches (i.e., the caches in execution platform 114). The configuration and metadata manager 1516 uses the metadata to determine which data partitions need to be accessed to retrieve data for processing a particular task or job. A monitor and workload analyzer 1518 oversees processes performed by the compute service manager 112 and manages the distribution of tasks (e.g., workload) across the virtual warehouses and execution nodes in the execution platform 114. The monitor and workload analyzer 1518 also redistributes tasks, as needed, based on changing workloads throughout the database system 102 and may further redistribute tasks based on a user (e.g., "external") query workload that may also be processed by the execution platform 114. The configuration and metadata manager 1516 and the monitor and workload analyzer 1518 are coupled to a data storage device 1520. Data storage device 1520 in FIG. 15 represents any data storage device within the database system 102. For example, data storage device 1520 may represent caches in execution platform 114, storage devices in cloud computing service platform 104, or any other storage device.

Figure 16:
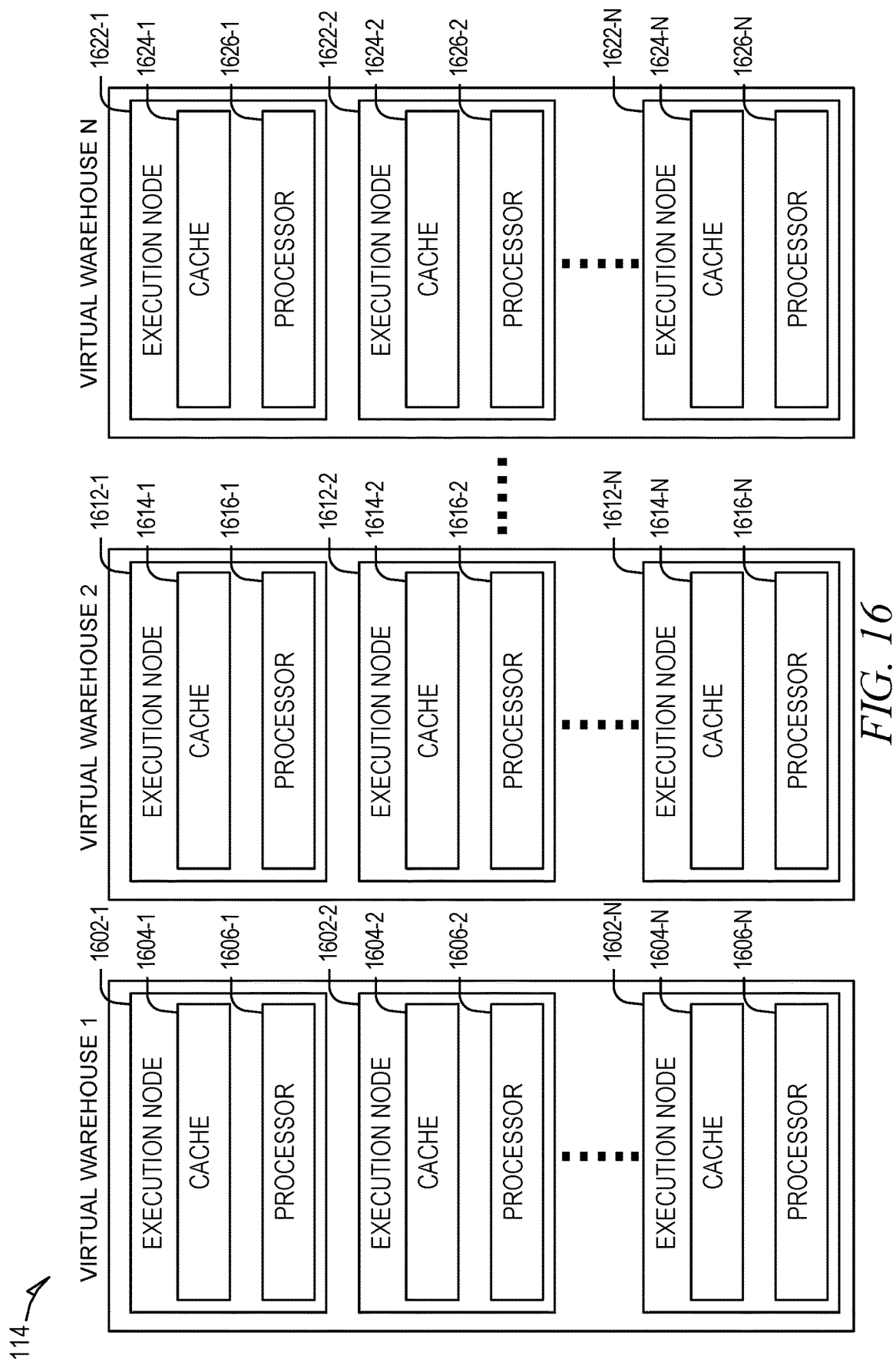
FIG. 16 is a block diagram illustrating components of an execution platform, in accordance with some embodiments of the present disclosure.

FIG. 16 is a block diagram illustrating components of the execution platform 114, in accordance with some embodiments of the present disclosure. As shown in FIG. 16, execution platform 114 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. The execution platform 114 can add new virtual warehouses and drop existing virtual warehouses in real-time based on the current processing needs of the systems and users. This flexibility allows the execution platform 114 to quickly deploy large amounts of computing resources. All virtual warehouses can access data from any data storage device (e.g., any storage device in cloud computing service platform 104).

Although each virtual warehouse shown in FIG. 16 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing service platform 104. Similarly, each of the execution nodes shown in FIG. 16 can access data from any of the data storage devices 124-1 to 124-N. In some embodiments, a particular virtual warehouse or a particular execution node may be temporarily assigned to a specific data storage device, but the virtual warehouse or execution node may later access data from any other data storage device.

In the example of FIG. 16, virtual warehouse 1 includes three execution nodes 1602-1, 1602-2, and 1602-N. Execution node 1602-1 includes a cache 1604-1 and a processor 1606-1. Execution node 1602-2 includes a cache 1604-2 and a processor 1606-2. Execution node 1602-N includes a cache 1604-N and a processor 1606-N. Each execution node 1602-1, 1602-2, and 1602-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 1612-1, 1612-2, and 1612-N. Execution node 1612-1 includes a cache 1614-1 and a processor 1616-1. Execution node 1612-2 includes a cache 1614-2 and a processor 1616-2. Execution node 1612-N includes a cache 1614-N and a processor 1616-N. Additionally, virtual warehouse 3 includes three execution nodes 1622-1, 1622-2, and 1622-N. Execution node 1622-1 includes a cache 1624-1 and a processor 1626-1. Execution node 1622-2 includes a cache 1624-2 and a processor 1626-2. Execution node 1622-N includes a cache 1624-N and a processor 1626-N.

In some embodiments, the execution nodes shown in FIG. 16 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 16 each include one data cache and one processor, alternate embodiments may include execution nodes containing any number of processors and any number of caches. Additionally, the caches may vary in size among the different execution nodes. The caches shown in FIG. 16 store, in the local execution node, data that was retrieved from one or more data storage devices in cloud computing service platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the cloud computing service platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 16 as having multiple execution nodes. The multiple execution nodes associated with each virtual warehouse may be implemented using multiple computing systems at multiple geographic locations. For example, an instance of virtual warehouse 1 implements execution nodes 1602-1 and 1602-2 on one computing platform at a geographic location and implements execution node 1602-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing service platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Described implementations of the subject matter can include one or more features, alone or in combination as illustrated below by way of example.

Example 1 is system comprising: one or more hardware processors; and one or more memories storing instructions that cause the one or more hardware processors to perform operations comprising: receiving, from a computing device, a query including input data and referencing an external table function provided by a remote software component; sending, to a proxy service, a set of requests to execute the external table function on the input data, a first request in the set of requests comprising a batch of input rows from the input data; receiving, from the proxy service, a first response to the first request, the first response including a first portion of result data and a pagination token, the result data comprising a result of executing the table function on the batch of input rows, the pagination token indicating that at least a second portion of the result data corresponding to the first batch of input rows is available; based on the first response including the pagination token, sending, to the proxy service, a second request to obtain the second portion of the result data; receiving, from the proxy service, one or more responses comprising at least the second portion of the result data corresponding to the first batch of input rows; and processing the result data according to the query.

Example 2 includes the system of Example 1, wherein the input data is grouped into multiple batches of input rows including the batch of input rows; and the operations further comprise: grouping the batches into a plurality of partitions; assigning each partition to one of multiple partition identifiers; and incorporating a partition identifier into the first request, the partition identifier identifying a partition into which the batch of input rows is grouped.

Example 3 includes the system of any one or more of Examples 1 or 2, wherein the first response and the one or more responses include the partition identifier.

Example 4 includes the system of any one or more of Examples 1-3, wherein the operations further comprise: prior to sending the first request, sending, to the proxy service, a preliminary request for metadata associated with query processing; and receiving, from the proxy service, the metadata associated with query processing.

Example 5 includes the system of any one or more of Examples 1-4, wherein the operations further comprise: configuring parallelism parameters associated with query processing based on the metadata.

Example 6 includes the system of any one or more of Examples 1-5, wherein the first request, second request, first response and at least one of the one or more responses include a batch identifier corresponding to the batch of input rows.

Example 7 includes the system of any one or more of Examples 1-6, wherein the one or more responses include a second response corresponding to the second request, the second response including the second portion of the result data.

Example 8 includes the system of any one or more of Examples 1-7, wherein the first request is electronically signed using temporary security credentials corresponding to a role associated with the proxy service that has permission to send calls to an endpoint corresponding to the remote software component.

Example 9 includes the system of any one or more of Examples 1-8, wherein the operations further comprise: in response to the query, accessing, from a data store, a function object associated with the remote software component, the function object identifying the endpoint corresponding to the remote software component and an integration object associated with the remote software component; and accessing, from the data store, the integration object identifying the role.

Example 10 includes the system of any one or more of Examples 1-9, wherein the operations further comprise: detecting an expiration of the temporary security credentials prior to receiving the first response from the proxy service; and in response to detecting the expiration of the temporary security credentials, refreshing the temporary security credentials.

Example 11 includes the system of any one or more of Examples 1-10, wherein detecting the expiration of the temporary security credentials comprises one of: determining that an expiration time limit associated with the temporary security credentials has expired; and receiving a timeout message from the proxy service.

Example 12 includes the system of any one or more of Examples 1-3, wherein the processing of the result data comprises one or more of: storing the result data; or performing one or more actions on the result data.

Example 13 includes the system of any one or more of Examples 1-3, wherein: each of the first and second request corresponds to a hypertext transfer protocol (HTTP) request; the first response and the one or more responses correspond to an HTTP response; and the result data comprises JSON encoded data, Apache Arrow encoded data, or XML encoded data.

Example 14 is a method comprising: receiving, from a computing device, a query including input data and referencing an external table function provided by a remote software component; sending, to a proxy service, a set of requests to execute the external table function on the input data, a first request in the set of requests comprising a batch of input rows from the input data; receiving, from the proxy service, a first response to the first request, the first response including a first portion of result data and a pagination token, the result data comprising a result of executing the table function on the batch of input rows, the pagination token indicating that at least a second portion of the result data corresponding to the first batch of input rows is available from the remote software component; based on the first response including the pagination token, sending, to the proxy service, a second request to obtain the second portion of the result data; receiving, from the proxy service, one or more responses comprising at least the second portion of the result data corresponding to the first batch of input rows; and processing the result data according to the query.

Example 15 includes the method of Example 14, wherein: the input data is grouped into multiple batches of input rows including the batch of input rows; and the method further comprises: grouping the batches into a plurality of partitions; assigning each partition to one of multiple partition identifiers; and incorporating a partition identifier into the first request, the partition identifier identifying a partition into which the batch of input rows is grouped.

Example 16 includes the method of any one or more of Examples 14 or 15, wherein the first response and the one or more responses include the partition identifier.

Example 17 includes the method of any one or more of Examples 14-16, further comprising: prior to sending the first request, sending, to the proxy service, a preliminary request for metadata associated with query processing; and receiving, from the proxy service, the metadata associated with query processing.

Example 18 includes the method of any one or more of Examples 14-17, further comprising: configuring parallelism parameters associated with query processing based on the metadata.

Example 19 includes the method of any one or more of Examples 14-18, wherein the first request, second request, first response and at least one of the one or more responses include a batch identifier corresponding to the batch of input rows.

Example 20 includes the method of any one or more of Examples 14-19, wherein: the one or more responses include a second response corresponding to the second request; and the second response includes the second portion of the result data.

Example 21 is a computer-storage medium comprising instructions that, when executed by one or more processors of a machine, configure the machine to perform operations comprising: receiving, from a computing device, a query including input data and referencing an external table function provided by a remote software component; sending, to a proxy service, a set of requests to execute the external table function on the input data, a first request in the set of requests comprising a batch of input rows from the input data; receiving, from the proxy service, a first response to the first request, the first response including a first portion of result data and a pagination token, the result data comprising a result of executing the table function on the batch of input rows, the pagination token indicating that at least a second portion of the result data corresponding to the first batch of input rows is available from the remote software component; based on the first response including the pagination token, sending, to the proxy service, a second request to obtain the second portion of the result data; receiving, from the proxy service, one or more responses comprising at least the second portion of the result data corresponding to the first batch of input rows; and processing the result data according to the query.

Example 22 includes the computer-storage medium of Example 21, wherein: the input data is grouped into multiple batches of input rows including the batch of input rows; and the operations further comprise: grouping the batches into a plurality of partitions; assigning each partition to one of multiple partition identifiers; and incorporating a partition identifier into the first request, the partition identifier identifying a partition into which the batch of input rows is grouped.

Example 23 includes the computer-storage medium of any one or more of Examples 21 or 22, wherein the first response and the one or more responses include the partition identifier.

Example 24 includes the computer-storage medium of any one or more of Examples 21-24, wherein the operations further comprise: prior to sending the first request, sending, to the proxy service, a preliminary request for metadata associated with query processing; and receiving, from the proxy service, the metadata associated with query processing.

Example 25 includes the computer-storage medium of any one or more of Examples 21-25, wherein the first request, second request, first response and at least one of the one or more responses include a batch identifier corresponding to the batch of input rows.

Figure 17:
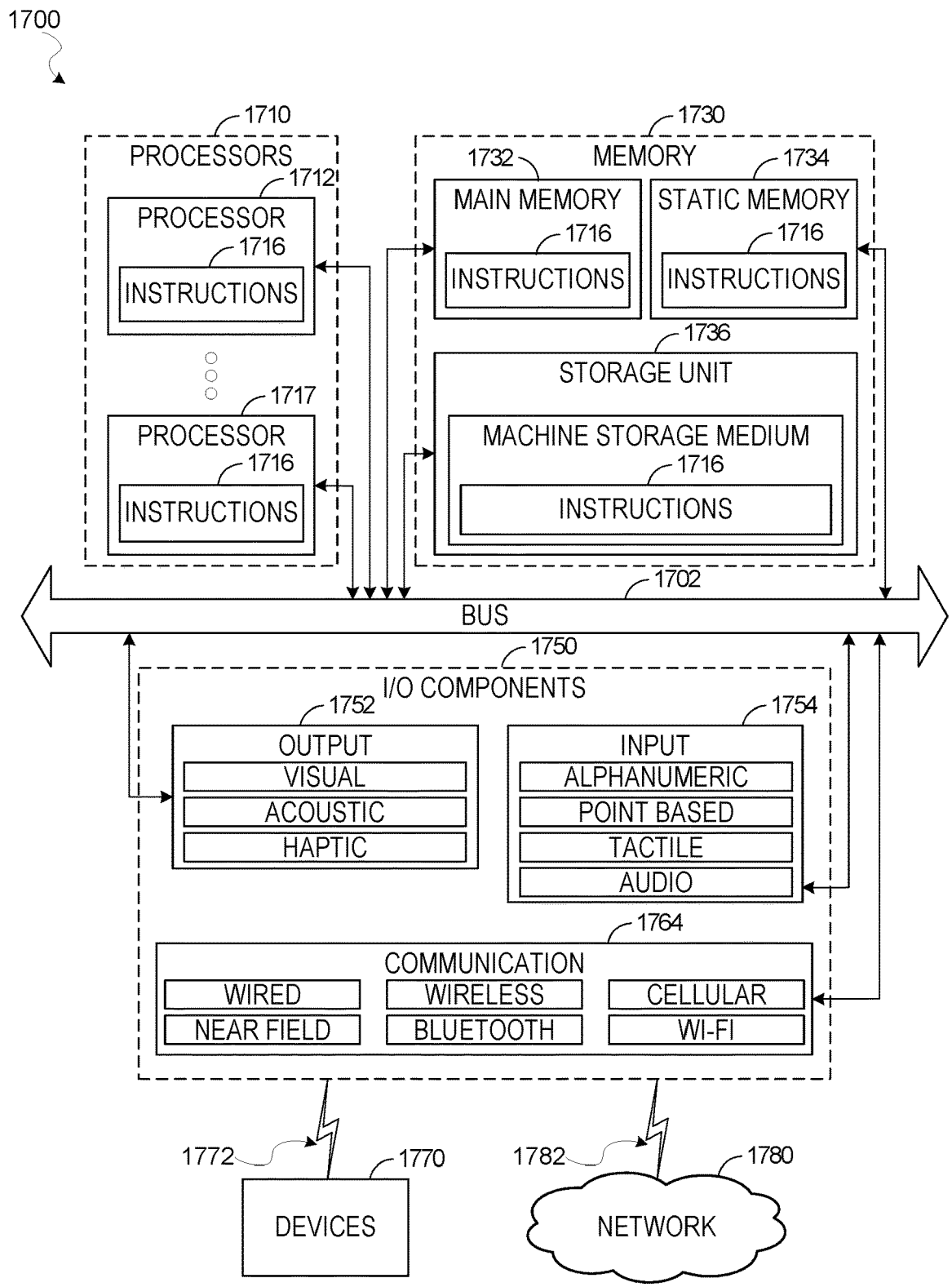
FIG. 17 illustrates a diagrammatic representation of a machine in the form of a computer system within which a set of instructions may be executed for causing the machine to perform any one or more of the methodologies discussed herein, in accordance with some embodiments of the present disclosure.

FIG. 17 illustrates a diagrammatic representation of a machine 1700 in the form of a computer system within which a set of instructions may be executed for causing the machine 1700 to perform any one or more of the methodologies discussed herein, according to an example embodiment. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example, the instructions 1716 may cause the machine 1700 to execute any one or more operations of any one or more of the methods 500, 600, 700, 800, or 900. As another example, the instructions 1716 may cause the machine 1700 to implement portions of the data flows illustrated in any one or more of FIGS. 2-4. In this way, the instructions 1716 transform a general, non-programmed machine into a particular machine 1700 (e.g., the remote computing environment 106, the access management system 110, the compute service manager 112, the execution platform 114, the access management system 118, the proxy service 120, and the computing devices 203, 207, 307, and 401) that is specially configured to carry out any one of the described and illustrated functions in the manner described herein.

In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 includes processors 1710, memory 1730, and input/output (I/O) components 1750 configured to communicate with each other such as via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1712 and a processor 1717 that may execute the instructions 1716. The term "processor" is intended to include multi-core processors 1710 that may comprise two or more independent processors (sometimes referred to as "cores") that may execute instructions 1716 contemporaneously. Although FIG. 17 shows multiple processors 1710, the machine 1700 may include a single processor with a single core, a single processor with multiple cores (e.g., a multi-core processor), multiple processors with a single core, multiple processors with multiple cores, or any combination thereof.

The memory 1730 may include a main memory 1732, a static memory 1734, and a storage unit 1736, all accessible to the processors 1710 such as via the bus 1702. The main memory 1732, the static memory 1734, and the storage unit 1736 store the instructions 1716 embodying any one or more of the methodologies or functions described herein. The instructions 1716 may also reside, completely or partially, within the main memory 1732, within the static memory 1734, within the storage unit 1736, within at least one of the processors 1710 (e.g., within the processor's cache memory), or any suitable combination thereof, during execution thereof by the machine 1700.

The I/O components 1750 include components to receive input, provide output, produce output, transmit information, exchange information, capture measurements, and so on. The specific I/O components 1750 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or another suitable device to interface with the network 1780. In further examples, the communication components 1764 may include wired communication components, wireless communication components, cellular communication components, and other communication components to provide communication via other modalities. The devices 1770 may be another machine or any of a wide variety of peripheral devices (e.g., a peripheral device coupled via a universal serial bus (USB)). For example, as noted above, the machine 1700 may correspond to any one of the remote computing environment 106, the access management system 110, the compute service manager 112, the execution platform 114, the access management system 118, the proxy service 150, and the computing devices 203, 207, 307, and 401, and the devices 1770 may include any other of these systems and devices.

The various memories (e.g., 1730, 1732, 1734, and/or memory of the processor(s) 1710 and/or the storage unit 1736) may store one or more sets of instructions 1716 and data structures (e.g., software) embodying or utilized by any one or more of the methodologies or functions described herein. These instructions 1716, when executed by the processor(s) 1710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., hypertext transfer protocol (HTTP)). Similarly, the instructions 1716 may be transmitted or received using a transmission medium via the coupling 1772 (e.g., a peer-to-peer coupling) to the devices 1770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1716 for execution by the machine 1700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 500, 600, 700, 800, and 900 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more hardware processors; and
   one or more memories storing instructions that cause the one or more hardware processors to perform operations comprising:
   receiving, from a computing device, a query including input data and referencing an external table function provided by a remote software component in a cloud computing service platform;
   configuring one or more parallelism parameters associated with processing the query based on a number of parallel calls supported by the remote software component or a proxy service that is communicatively coupled to the remote software component, the configuring of the one or more parallelism parameters including determining a number of parallel requests to send to the proxy service, the proxy service comprising an externally managed web application programming interface (API) management system;
   sending, to the proxy service, the number of parallel requests to execute the external table function on the input data;
   receiving, from the proxy service, one or more responses to number of parallel requests, the one or more responses comprising result data, the result data comprising a result of executing the table function on the input data; and
   processing the result data according to the query.

2. The system of claim 1, wherein:
   the input data is grouped into multiple batches of input rows; and
   the operations further comprise:

grouping the batches into a plurality of partitions;
assigning each partition to one of multiple partition identifiers; and
incorporating one or more partition identifiers into the number of parallel requests.

3. The system of claim 1, wherein:
the number of parallel requests include a first request comprising a batch of input rows from the input data;
the one or more responses include a first response that includes a first portion of the result data and a pagination token, the pagination token indicating that at least a second portion of the result data corresponding to the batch of input rows is available; and
the operations further comprise:
sending, to the proxy service, a second request to obtain the second portion of the result data based on the first response including the pagination token; and
receiving, from the proxy service, the second portion of the result data corresponding to the first batch of input rows.

4. The system of claim 3, wherein the first request, second request, and at least one of the one or more responses include a batch identifier corresponding to the batch of input rows.

5. The system of claim 3, wherein the one or more responses include a second response corresponding to the second request, the second response including the second portion of the result data.

6. The system of claim 1, wherein the operations further comprise obtaining, from the proxy service, metadata associated with processing the query, the metadata comprising an indicator of the number of parallel requests that are supported by the proxy service or the remote software component.

7. The system of claim 6, wherein the metadata further comprises information describing properties of expected result data including at least one of: a maximum number of rows, a maximum size, or data types.

8. The system of claim 1, wherein a first request in the number of parallel requests is electronically signed using temporary security credentials corresponding to a role associated with the proxy service that has permission to send calls to an endpoint corresponding to the remote software component.

9. The system of claim 8, wherein the operations further comprise:
in response to the query, accessing, from a data store, a function object associated with the remote software component, the function object identifying the endpoint corresponding to the remote software component and an integration object associated with the remote software component; and
accessing, from the data store, the integration object identifying the role.

10. The system of claim 1, wherein:
each request in the number of parallel requests corresponds to a hypertext transfer protocol (HTTP) request;
each of the one or more responses correspond to an HTTP response; and
the result data comprises JSON encoded data, Apache Arrow encoded data, or XML encoded data.

11. A method comprising:
receiving, from a computing device, a query including input data and referencing an external table function provided by a remote software component in a cloud computing service platform;
configuring one or more parallelism parameters associated with processing the query based on a number of parallel calls supported by the remote software component or a proxy service that is communicatively coupled to the remote software component, the configuring of the one or more parallelism parameters including determining a number of parallel requests to send to the proxy service, the proxy service comprising an externally managed web application programming interface (API) management system;
sending, to the proxy service, the number of parallel requests to execute the external table function on the input data
receiving, from the proxy service, one or more responses to number of parallel requests, the one or more responses comprising result data, the result data comprising a result of executing the table function on the input data; and
processing the result data according to the query.

12. The method of claim 11, wherein:
the input data is grouped into multiple batches of input rows; and
the method further comprises:
grouping the batches into a plurality of partitions;
assigning each partition to one of multiple partition identifiers; and
incorporating one or more partition identifiers into the number of parallel requests.

13. The method of claim 11, wherein:
the number of parallel requests include a first request comprising a batch of input rows from the input data;
the one or more responses include a first response that includes a first portion of the result data and a pagination token, the pagination token indicating that at least a second portion of the result data corresponding to the batch of input rows is available; and
the method further comprises:
sending, to the proxy service, a second request to obtain the second portion of the result data based on the first response including the pagination token; and
receiving, from the proxy service, the second portion of the result data corresponding to the first batch of input rows.

14. The method of claim 13, wherein the first request, second request, and at least one of the one or more responses include a batch identifier corresponding to the batch of input rows.

15. The method of claim 13, wherein the one or more responses include a second response corresponding to the second request, the second response including the second portion of the result data.

16. The method of claim 11, further comprising obtaining, from the proxy service, metadata associated with processing the query, the metadata comprising an indicator of the number of parallel requests that are supported by the proxy service or the remote software component.

17. The method of claim 16, wherein the metadata further comprises information describing properties of expected result data including at least one of: a maximum number of rows, a maximum size, or data types.

18. The method of claim 11, wherein a first request in the number of parallel requests is electronically signed using temporary security credentials corresponding to a role associated with the proxy service that has permission to send calls to an endpoint corresponding to the remote software component.

19. The method of claim 18, further comprising:
in response to the query, accessing, from a data store, a function object associated with the remote software component, the function object identifying the endpoint corresponding to the remote software component and an integration object associated with the remote software component; and accessing, from the data store, the integration object identifying the role.

20. The method of claim 11, wherein:

each request in the number of parallel requests corresponds to a hypertext transfer protocol (HTTP) request;

each of the one or more responses correspond to an HTTP response; and the result data comprises JSON encoded data, Apache Arrow encoded data, or XML encoded data.

21. A computer-storage medium comprising instructions that, when executed by one or more processors of a machine, configure the machine to perform operations comprising:

receiving, from a computing device, a query including input data and referencing an external table function provided by a remote software component in a cloud computing service platform;

configuring one or more parallelism parameters associated with processing the query based on a number of parallel calls supported by the remote software component or a proxy service that is communicatively coupled to the remote software component, the configuring of the one or more parallelism parameters including determining a number of parallel requests to send to the proxy service, the proxy service comprising an externally managed web application programming interface (API) management system;

sending, to the proxy service, the number of parallel requests to execute the external table function on the input data;

receiving, from the proxy service, one or more responses to number of parallel requests, the one or more responses comprising result data, the result data comprising a result of executing the table function on the input data; and processing the result data according to the query.

22. The computer-storage medium of claim 21, wherein:

the input data is grouped into multiple batches of input rows; and the operations further comprise:

grouping the batches into a plurality of partitions;

assigning each partition to one of multiple partition identifiers; and incorporating one or more partition identifiers into the number of parallel requests.

23. The computer-storage medium of claim 21, wherein:

the number of parallel requests include a first request comprising a batch of input rows from the input data;

the one or more responses include a first response that includes a first portion of the result data and a pagination token, the pagination token indicating that at least a second portion of the result data corresponding to the batch of input rows is available; and the operations further comprise:

sending, to the proxy service, a second request to obtain the second portion of the result data based on the first response including the pagination token; and receiving, from the proxy service, the second portion of the result data corresponding to the first batch of input rows.

24. The computer-storage medium of claim 23, wherein the first request, second request, and at least one of the one or more responses include a batch identifier corresponding to the batch of input rows.

25. The computer-storage medium of claim 23, wherein the one or more responses include a second response corresponding to the second request, the second response including the second portion of the result data.

26. The computer-storage medium of claim 21, wherein the operations further comprise obtaining, from the proxy service, metadata associated with processing the query, the metadata comprising an indicator of the number of parallel requests that are supported by the proxy service or the remote software component.

27. The computer-storage medium of claim 26, wherein the metadata further comprises information describing properties of expected result data including at least one of: a maximum number of rows, a maximum size, or data types.

28. The computer-storage medium of claim 21, wherein a first request in the number of parallel requests is electronically signed using temporary security credentials corresponding to a role associated with the proxy service that has permission to send calls to an endpoint corresponding to the remote software component.

29. The computer-storage medium of claim 28, wherein the operations further comprise:

in response to the query, accessing, from a data store, a function object associated with the remote software component, the function object identifying the endpoint corresponding to the remote software component and an integration object associated with the remote software component; and accessing, from the data store, the integration object identifying the role.

30. The computer-storage medium of claim 21, wherein:

each request in the number of parallel requests corresponds to a hypertext transfer protocol (HTTP) request;

each of the one or more responses correspond to an HTTP response; and the result data comprises JSON encoded data, Apache Arrow encoded data, or XML encoded data.

* * * * *

UNITED STATES PATENT AND TRADEMARK OFFICE
CERTIFICATE OF CORRECTION

PATENT NO. : 11,675,784 B2
APPLICATION NO. : 17/823132
DATED : June 13, 2023
INVENTOR(S) : Chintala et al.

It is certified that error appears in the above-identified patent and that said Letters Patent is hereby corrected as shown below:

In the Claims

In Column 34, Line 11, in Claim 11, delete "data" and insert --data;-- therefor

Signed and Sealed this
First Day of October, 2024

Katherine Kelly Vidal
*Director of the United States Patent and Trademark Office*